(12) United States Patent
Miyagishima

(10) Patent No.: US 12,379,584 B2
(45) Date of Patent: Aug. 5, 2025

(54) OBSERVATION OPTICAL SYSTEM AND OPTICAL APPARATUS

(71) Applicant: FUJIFILM Corporation, Tokyo (JP)

(72) Inventor: Shunsuke Miyagishima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 566 days.

(21) Appl. No.: 17/836,832

(22) Filed: Jun. 9, 2022

(65) Prior Publication Data

US 2022/0404607 A1   Dec. 22, 2022

(30) Foreign Application Priority Data

Jun. 21, 2021   (JP) .................. 2021-102629

(51) Int. Cl.
*G02B 25/00*   (2006.01)
*G02B 9/34*   (2006.01)

(52) U.S. Cl.
CPC ............. *G02B 25/001* (2013.01); *G02B 9/34* (2013.01)

(58) Field of Classification Search
CPC ... G02B 9/34; G02B 9/36; G02B 9/60; G02B 25/001; G02B 15/142
See application file for complete search history.

(56) References Cited

U.S. PATENT DOCUMENTS

| | | | | |
|---|---|---|---|---|
| 5,579,167 A | * | 11/1996 | Oomura | ............... G02B 25/001 359/645 |
| 2012/0127595 A1 | | 5/2012 | Matsuo | |
| 2015/0103411 A1 | * | 4/2015 | Katagata | ............... G02B 25/001 359/644 |
| 2015/0205091 A1 | | 7/2015 | Matsuo et al. | |
| 2015/0212289 A1 | | 7/2015 | Matsuo | |
| 2015/0362720 A1 | | 12/2015 | Saito | |
| 2016/0062104 A1 | * | 3/2016 | Kimura | ................ G02B 25/001 359/643 |
| 2018/0052383 A1 | | 2/2018 | Miyagishima et al. | |
| 2018/0067242 A1 | * | 3/2018 | Lai | ............................ G02B 9/04 |

(Continued)

FOREIGN PATENT DOCUMENTS

| | | |
|---|---|---|
| JP | H05-40232 A | 2/1993 |
| JP | 5136618 B2 | 2/2013 |

(Continued)

OTHER PUBLICATIONS

"Notice of Reasons for Refusal" Office Action issued in JP 2021-102629; mailed by the Japanese Patent Office on Dec. 17, 2024.

*Primary Examiner* — Ricky L Mack
*Assistant Examiner* — Anna Smith
(74) *Attorney, Agent, or Firm* — Studebaker Brackett PLLC

(57) ABSTRACT

An observation optical system includes a display element and an eyepiece lens arranged on an eyepoint side of the display element. The eyepiece lens consists of a first lens having positive refractive power, a second lens having negative refractive power, and a rear side lens group including two or more lenses consecutively in order from a side closest to the display element to the eyepoint side. In a case where a half value of a longest diameter of a display region in the display element is denoted by H, and a focal length of the eyepiece lens is denoted by f, the observation optical system satisfies a conditional expression represented by $0.3 < H/f < 0.5$.

18 Claims, 12 Drawing Sheets

EXAMPLE 1

(56) References Cited

U.S. PATENT DOCUMENTS

| | | | |
|---|---|---|---|
| 2018/0307036 A1* | 10/2018 | Iba | G02B 3/04 |
| 2018/0314035 A1* | 11/2018 | Nakahara | G02B 1/041 |
| 2018/0329200 A1 | 11/2018 | Matsuo et al. | |
| 2019/0171000 A1* | 6/2019 | Takumi | G02B 25/001 |
| 2019/0271900 A1* | 9/2019 | Takumi | G03B 13/06 |
| 2020/0174341 A1 | 6/2020 | Shinobu | |
| 2020/0301108 A1* | 9/2020 | Syu | G02B 13/004 |

FOREIGN PATENT DOCUMENTS

| | | | |
|---|---|---|---|
| JP | 2015-075713 A | 4/2015 | |
| JP | 2016-001209 A | 1/2016 | |
| JP | 2016-051066 A | 4/2016 | |
| JP | 6003503 B2 | 10/2016 | |
| JP | 6079111 B2 | 2/2017 | |
| JP | 2018-028632 A | 2/2018 | |
| JP | 2018-124349 A | 8/2018 | |
| JP | 2019-128527 A | 8/2019 | |
| JP | 6634767 B2 | 1/2020 | |
| JP | 2020-091340 A | 6/2020 | |
| JP | 2020-112815 A | 7/2020 | |
| JP | 2020-166276 A | 10/2020 | |
| JP | 2020-170022 A | 10/2020 | |
| JP | 2020-181222 A | 11/2020 | |
| JP | 2021-005111 A | 1/2021 | |
| JP | 6816347 B2 | 1/2021 | |
| WO | 2019/054359 A1 | 3/2019 | |

\* cited by examiner

EXAMPLE 1

EXAMPLE 2

EXAMPLE 3

EXAMPLE 4

EXAMPLE 5

OBSERVATION OPTICAL SYSTEM AND OPTICAL APPARATUS

CROSS-REFERENCE TO RELATED APPLICATIONS

The present application claims priority under 35 U.S.C. § 119 to Japanese Patent Application No. 2021-102629, filed on Jun. 21, 2021. The above application is hereby expressly incorporated by reference, in its entirety, into the present application.

BACKGROUND

Technical Field

The present disclosure relates to an observation optical system and an optical apparatus.

Related Art

In the related art, lens systems disclosed in JP2020-166276A, JP2020-181222A, and JP2016-001209A have been known as an eyepiece lens applicable to an observation optical system.

In recent years, there has been a demand for an observation optical system that is reduced in size and has high specifications while having favorable performance.

SUMMARY

An object of the present disclosure is to provide an observation optical system that can establish both of size reduction and high specifications while having favorable performance, and an optical apparatus comprising the observation optical system.

An observation optical system according to an aspect of the present disclosure comprises a display element and an eyepiece lens arranged on an eyepoint side of the display element, in which the eyepiece lens consists of a first lens having positive refractive power, a second lens having negative refractive power, and a rear side lens group including two or more lenses in order from a display element side to the eyepoint side, and in a case where a half value of a longest diameter of a display region in the display element is denoted by H, a focal length of the eyepiece lens is denoted by f, a refractive index of the first lens at a d line is denoted by N1, a refractive index of the second lens at the d line is denoted by N2, a thickness of the second lens on an optical axis is denoted by d2, and a paraxial curvature radius of a surface of the second lens on the display element side is denoted by R2f, Conditional Expressions (1), (2), and (3) are satisfied, which are represented by $$0.3 < H/f < 0.5 \tag{1}$$

$$0.12 < N1 - N2 < 0.3 \tag{2}$$

$$-0.2 < d2/R2f < -0.003 \tag{3}$$

The number of lenses included in the eyepiece lens may be configured to be four or five.

In the observation optical system of the above aspect, in a case where a distance from a lens surface of the eyepiece lens closest to the display element side to a lens surface of the eyepiece lens closest to the eyepoint side on the optical axis is denoted by dL, Conditional Expression (4) is preferably satisfied, which is represented by $$0.5 < dL/f < 2 \tag{4}$$

In the observation optical system of the above aspect, in a case where a paraxial curvature radius of a lens surface of the eyepiece lens closest to the eyepoint side is denoted by RRr, Conditional Expression (5) is preferably satisfied, which is represented by $$-1.3 < f/RRr < -0.2 \tag{5}$$

In the observation optical system of the above aspect, in a case where a thickness of a lens of the eyepiece lens closest to the eyepoint side on the optical axis is denoted by dr, and a paraxial curvature radius of a lens surface of the eyepiece lens closest to the eyepoint side is denoted by RRr, Conditional Expression (6) is preferably satisfied, which is represented by $$-0.3 < dr/RRr < -0.01 \tag{6}$$

The second lens is preferably a biconcave lens.

In the observation optical system of the above aspect, in a case where a combined focal length of the first lens and the second lens is denoted by f12, Conditional Expression (7) is preferably satisfied, which is represented by $$0.05 < f/f12 < 1.5 \tag{7}$$

In the observation optical system of the above aspect, in a case where a paraxial curvature radius of a surface of the first lens on the eyepoint side is denoted by R1r, Conditional Expression (8) is preferably satisfied, which is represented by $$-0.2 < (R2f - R1r)/(R2f + Rh) < -0.01 \tag{8}$$

In the observation optical system of the above aspect, in a case where a paraxial curvature radius of a surface, on the display element side, of a lens of the eyepiece lens closest to the eyepoint side is denoted by RRf, and a paraxial curvature radius of a surface, on the eyepoint side, of a lens adjacent to the display element side of the lens of the eyepiece lens closest to the eyepoint side is denoted by RQr, Conditional Expression (9) is preferably satisfied, which is represented by $$0.1 < (RRf - RQr)/(RRf + RQr) < 2 \tag{9}$$

In the observation optical system of the above aspect, in a case where a paraxial curvature radius of a surface of the second lens on the eyepoint side is denoted by R2r, Conditional Expression (10) is preferably satisfied, which is represented by $$0.1 < (R2r + R2f)/(R2r - R2f) < 1.6 \tag{10}$$

In the observation optical system of the above aspect, in a case where a focal length of the rear side lens group is denoted by fGR, Conditional Expression (11) is preferably satisfied, which is represented by $$0.5 < f/fGR < 1.5 \tag{11}$$

In the observation optical system of the above aspect, in a case where a focal length of the first lens is denoted by f1, Conditional Expression (12) is preferably satisfied, which is represented by $$0.5 < f/f1 < 1.9 \tag{12}$$

In the observation optical system of the above aspect, in a case where a focal length of a lens of the rear side lens group closest to the display element side is denoted by f3, Conditional Expression (13) is preferably satisfied, which is represented by $$0.1 < f/f3 < 2 \tag{13}$$

In the observation optical system of the above aspect, in a case where a focal length of the first lens is denoted by f1, and a focal length of a lens of the rear side lens group closest to the display element side is denoted by f3, Conditional Expression (14) is preferably satisfied, which is represented by $$0.01 < f1/f3 < 1.5 \quad (14).$$

In the observation optical system of the above aspect, in a case where a focal length of the first lens is denoted by f1, Conditional Expression (15) is preferably satisfied, which is represented by $$0.1 < H/f1 < 0.9 \quad (15).$$

An absorption layer that absorbs light is preferably provided in at least a part of a peripheral portion of the second lens.

In diopter adjustment, an entire eyepiece lens preferably moves as a single body.

An optical apparatus according to another aspect of the present disclosure comprises the observation optical system of the above aspect.

In the present specification, "consist of" "consisting of" is intended to mean that a lens that substantially does not have refractive power, optical elements such as a stop, a filter, and a cover glass other than a lens, and a lens flange, a lens barrel, and the like may be included in addition to illustrated constituents.

In the present specification, a "lens having positive refractive power" and a "positive lens" have the same meaning. A "lens having negative refractive power" and a "negative lens" have the same meaning. A "single lens" means one non-cemented lens. A compound aspherical lens (a lens that is composed of a spherical lens and a film of an aspherical shape formed on the spherical lens as a single body and functions as one aspherical lens as a whole) is not regarded as a cemented lens and is treated as one lens. A sign of refractive power, a curvature radius, and a surface shape related to a lens including an aspherical surface are considered in a paraxial region unless otherwise specified. For a sign of the curvature radius, the sign of the curvature radius of a surface having a shape of a convex surface facing toward the display element side is positive, and the sign of the curvature radius of a surface having a shape of a convex surface facing toward the eyepoint side is negative.

The "focal length" used in the conditional expressions is a paraxial focal length. Values used in the conditional expressions are values based on the d line in a state where diopter is −1 diopter. In the present specification, "d line", "C line", and "F line" are emission lines. A wavelength of the d line is 587.56 nanometers (nm). A wavelength of the C line is 656.27 nanometers (nm). A wavelength of the F line is 486.13 nanometers (nm).

According to the present disclosure, an observation optical system that can establish both of size reduction and high specifications while having favorable performance, and an optical apparatus including the observation optical system can be provided.

DESCRIPTION OF EMBODIMENTS

Hereinafter, an embodiment of the present disclosure will be described with reference to the drawings.

Figure 1:
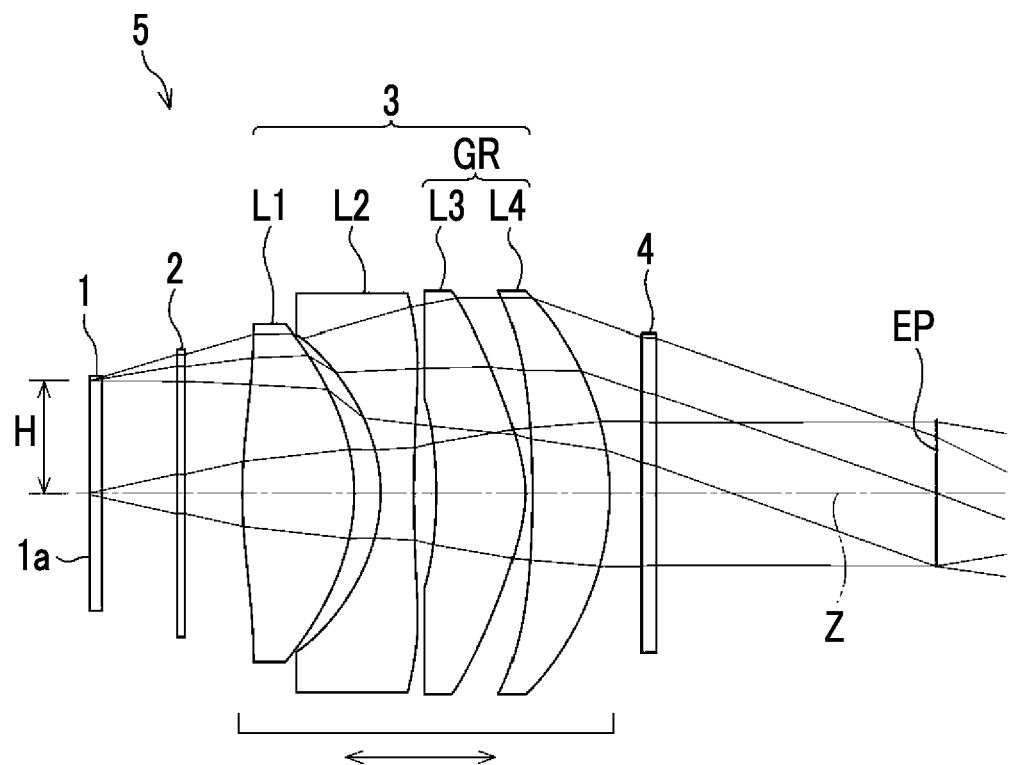
FIG. 1 is a cross-sectional view that corresponds to an observation optical system of Example 1 and illustrates a configuration and luminous flux of an observation optical system according to one embodiment.
Figure 2:
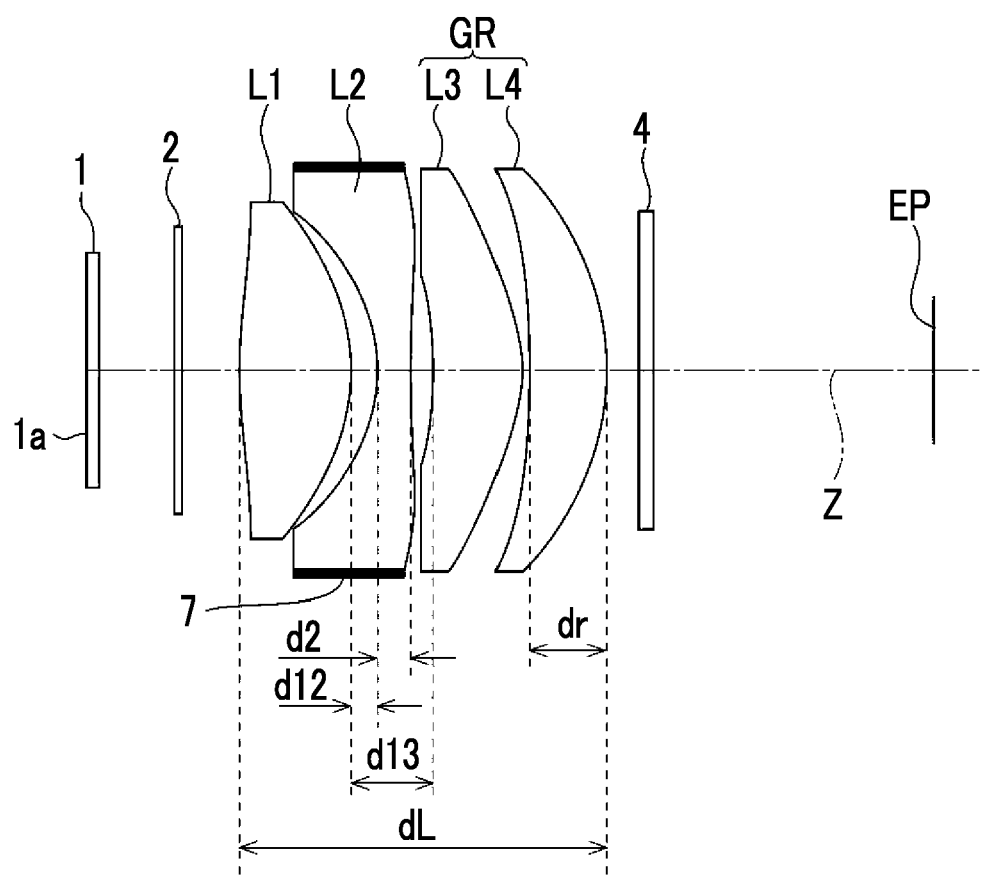
FIG. 2 is a cross-sectional view for describing the configuration of the observation optical system in FIG. 1.

FIG. 1 illustrates a cross-sectional view of a configuration and luminous flux of an observation optical system 5 according to one embodiment of the present disclosure. In FIG. 1, on-axis luminous flux and off-axis luminous flux corresponding to the maximum apparent field of view are illustrated as the luminous flux. The example illustrated in FIG. 1 corresponds to Example 1 described later. In addition, FIG. 2 illustrates a cross-sectional view for describing the configuration of the observation optical system 5 in FIG. 1. In FIG. 1 and FIG. 2, a left side is illustrated as a display element side, and a right side is illustrated as an eyepoint side. An eyepoint EP in FIG. 1 and FIG. 2 does not illustrate a shape and illustrates a position in an optical axis direction. In the following description related to the embodiment, FIG. 1 will be mainly referred to, and FIG. 2 will be referred to as needed.

The observation optical system 5 comprises a display element 1 and an eyepiece lens 3 arranged on the eyepoint side of the display element 1. The display element 1 is an element that displays an image. The display element 1 has a display region 1a in which the image is displayed. For example, the display element 1 can be configured as an image display panel consisting of a liquid crystal display device or an organic electroluminescence (EL) display element. The display element 1 and the eyepiece lens 3 are arranged at a predetermined air interval. Accordingly, an interval for diopter adjustment can be secured.

The display element 1 is an example of an observed object, and the eyepiece lens 3 is used for observing the image displayed in the display region 1a of the display element 1. That is, the observation optical system 5 is configured to observe the image displayed on the display element 1 through the eyepiece lens 3.

In the example in FIG. 1, an optical member 2 is arranged between the display element 1 and the eyepiece lens 3, and an optical member 4 is arranged between the eyepiece lens 3 and the eyepoint EP. The optical member 2 and the optical member 4 are parallel flat plate-shaped members not having refractive power and are assumed to be cover glasses for protection, various filters, or the like. In the disclosed technology, a configuration in which at least one of the optical member 2 or the optical member 4 is removed is also available.

The eyepiece lens 3 consists of a first lens L1 having positive refractive power, a second lens L2 having negative refractive power, and a rear side lens group GR including two or more lenses in order from the display element side to the eyepoint side along an optical axis Z. Configuring the number of lenses included in the eyepiece lens 3 to be four or more is advantageous for favorably correcting an overall aberration. The number of lenses included in the eyepiece lens 3 may be configured to be four or five. Such a case is advantageous for achieving a small configuration by decreasing the number of lenses while favorably correcting the overall aberration.

As an example, the eyepiece lens 3 in FIG. 1 consists of the first lens L1 having positive refractive power, the second lens L2 having negative refractive power, a third lens L3, and a fourth lens L4 in order from the display element side to the eyepoint side. In the example in FIG. 1, the rear side lens group GR consists of the third lens L3 and the fourth lens L4.

In the example in FIG. 1, all of the lenses included in the eyepiece lens 3 are non-cemented single lenses and are arranged at an air interval with respect to an adjacent lens on the optical axis. This configuration can increase a degree of design freedom and thus, is advantageous for correcting various aberrations and also advantageous for obtaining a wider apparent field of view.

The eyepiece lens 3 may be configured to include an aspherical lens. Including the aspherical lens is advantageous for favorable aberration correction.

As in the example in FIG. 1, the entire eyepiece lens preferably moves as a single body in diopter adjustment. Such a case is advantageous for suppressing aberration changes in the diopter adjustment. A bracket and a bidirectional arrow in a horizontal direction below the first lens L1 to the fourth lens L4 in FIG. 1 illustrate that these four lenses move as a single body along the optical axis Z in the diopter adjustment. In the present specification, "moving as a single body" means moving by the same amount in the same direction at the same time.

The second lens L2 is preferably a biconcave lens. In such a case, an effect of causing a ray exiting toward the rear side lens group GR from the second lens L2 to diverge can be increased. Consequently, an angle of off-axis luminous flux incident on the eyepiece lens 3 from the display element 1 with respect to the optical axis Z of a principal ray can be decreased. The angle of the off-axis luminous flux incident on the eyepiece lens 3 from the display element 1 with respect to the optical axis Z of the principal ray is preferably as close to zero as possible.

The second lens L2 is a negative lens. Thus, a thickness of an edge part portion is greater than a thickness of a center portion in the lens. As illustrated in FIG. 2 as an example, an absorption layer 7 that absorbs light is preferably provided in at least a part of a peripheral portion of the second lens L2. In such a case, an effect of reducing ghosts and flare can be obtained. In FIG. 2, the absorption layer 7 is illustrated in an exaggerated manner for easy understanding, and a thickness of the absorption layer 7 is different from the actual thickness thereof. As an example, a black paint can be used as the absorption layer 7. For example, the absorption layer 7 may be configured of resin including a black pigment and/or a black dye. As an example, epoxy resin can be used as the resin. Alternatively, the absorption layer 7 may be a vapor deposition film. For example, at least one of titanium, titanium oxide, or chromium may be used as a material of the vapor deposition film. An average value of absorbance of the absorption layer 7 within a wavelength range of 400 to 700 nm is preferably greater than or equal to 50%. The absorption layer 7 may also be provided in at least a part of a peripheral portion of a lens other than the second lens L2 as needed.

In a case where a half value of the longest diameter of the display region 1a in the display element 1 is denoted by H, and a focal length of the eyepiece lens 3 is denoted by f, the observation optical system 5 preferably satisfies Conditional Expression (1) below. Causing a corresponding value of Conditional Expression (1) not to be less than or equal to a lower limit thereof is advantageous for increasing the apparent field of view. Causing the corresponding value of Conditional Expression (1) not to be greater than or equal to an upper limit thereof is advantageous for suppressing the aberrations such as a field curvature. In order to obtain more favorable characteristics, the observation optical system 5 more preferably satisfies Conditional Expression (1-1) below and still more preferably satisfies Conditional Expression (1-2) below.

$$0.3 < H/f < 0.5 \tag{1}$$

$$0.33 < H/f < 0.48 \tag{1-1}$$

$$0.35 < H/f < 0.45 \tag{1-2}$$

In the present specification, the "longest diameter of the display region 1a in the display element 1" related to H means a double value of a distance between the optical axis Z and a point most separated from the optical axis Z in a diameter direction in the display region 1a that coincides with the optical axis Z at a centroid thereof. For example, in a case where the display region 1a has a rectangular shape, a half length of a diagonal of the display region 1a can be set as H. In addition, for example, in a case where the display region 1a is a perfect circle, a radius of the display region 1a can be set as H. In a case where the display region 1a is an ellipse, a half of the longest diameter (major axis) among diameters of the display region 1a can be set as H.

In addition, the display region 1a means a region in which the image is actually displayed. For example, in a case where the display element 1 comprises a display portion of an aspect ratio of 4:3 in which a plurality of pixels are arranged, and an image of an aspect ratio of 3:2 is displayed in a part of the display portion, the display region 1a refers to a region in which the image of the aspect ratio of 3:2 is displayed. Accordingly, a diameter of the display element 1 does not necessarily coincide with the longest diameter of the display region 1a.

In a case where a refractive index of the first lens L1 at the d line is denoted by N1, and a refractive index of the second lens L2 at the d line is denoted by N2, the observation optical system 5 preferably satisfies Conditional Expression (2) below. Causing a corresponding value of Conditional Expression (2) not to be less than or equal to a lower limit thereof can suppress an excessive decrease in difference between an Abbe number of the first lens L1 and an Abbe number of the second lens L2 and thus, is advantageous for correcting a chromatic aberration. Causing the corresponding value of Conditional Expression (2) not to be greater than or equal to an upper limit thereof can suppress an excessive decrease in Abbe number of the first lens L1, that is, can suppress an excessive increase in dispersion of the first lens L1, and thus, is advantageous for correcting the chromatic aberration. In order to obtain more favorable characteristics, the observation optical system 5 more preferably satisfies Conditional Expression (2-1) below and still more preferably satisfies Conditional Expression (2-2) below.

$$0.12 < N1 - N2 < 0.3 \tag{2}$$

$$0.125 < N1 - N2 < 0.28 \tag{2-1}$$

$$0.13 < N1 - N2 < 0.26 \tag{2-2}$$

In a case where a thickness of the second lens L2 on the optical axis is denoted by d2, and a paraxial curvature radius of a surface of the second lens L2 on the display element side is denoted by R2f, the observation optical system 5 preferably satisfies Conditional Expression (3) below. As an example, d2 is illustrated in FIG. 2. Causing a corresponding value of Conditional Expression (3) not to be less than or equal to a lower limit thereof can suppress an excessive decrease in |R2f| and thus, can contribute to improvement of manufacturability of the lens. In addition, causing the corresponding value of Conditional Expression (3) not to be less than or equal to the lower limit thereof can suppress an excessive increase in refractive power of the second lens L2 and thus, is advantageous for correcting a lateral chromatic aberration and the field curvature. Causing the corresponding value of Conditional Expression (3) not to be greater than or equal to an upper limit thereof can suppress an excessive increase in thickness ratio, that is, a ratio of the thickness of the center portion to the thickness of the edge part portion in the lens, and thus, can contribute to improvement of workability. In order to obtain more favorable characteristics, the observation optical system 5 more preferably satisfies Conditional Expression (3-1) below and still more preferably satisfies Conditional Expression (3-2) below.

$$-0.2 < d2/R2f < -0.003 \tag{3}$$

$$-0.19 < d2/R2f < -0.008 \tag{3-1}$$

$$-0.185 < d2/R2f < -0.013 \tag{3-2}$$

In a case where a distance from a lens surface of the eyepiece lens 3 closest to the display element side to a lens surface of the eyepiece lens 3 closest to the eyepoint side on the optical axis is denoted by dL, and the focal length of the eyepiece lens 3 is denoted by f, the observation optical system 5 preferably satisfies Conditional Expression (4) below. Causing a corresponding value of Conditional Expression (4) not to be less than or equal to a lower limit thereof can suppress a decrease in refractive power of the eyepiece lens 3 and thus, is advantageous for securing a wide apparent field of view. Causing the corresponding value of Conditional Expression (4) not to be greater than or equal to an upper limit thereof is advantageous for reducing a total length. In order to obtain more favorable characteristics, the observation optical system 5 more preferably satisfies Conditional Expression (4-1) below and still more preferably satisfies Conditional Expression (4-2) below.

$$0.5 < dL/f < 2 \tag{4}$$

$$0.7 < dL/f < 1.8 \tag{4-1}$$

$$0.8 < dL/f < 1.5 \tag{4-2}$$

In a case where the focal length of the eyepiece lens 3 is denoted by f, and a paraxial curvature radius of the lens surface of the eyepiece lens 3 closest to the eyepoint side is denoted by RRr, the observation optical system 5 preferably satisfies Conditional Expression (5) below. Causing a corresponding value of Conditional Expression (5) not to be less than or equal to a lower limit thereof can suppress an increase in refractive power of the lens surface of the eyepiece lens 3 closest to the eyepoint side and thus, is advantageous for securing a high eyepoint. Causing the corresponding value of Conditional Expression (5) not to be greater than or equal to an upper limit thereof can suppress a decrease in refractive power of the lens of the eyepiece lens 3 closest to the eyepoint side and thus, is advantageous for suppressing an astigmatism and a spherical aberration. In order to obtain more favorable characteristics, the observation optical system 5 more preferably satisfies Conditional Expression (5-1) below and still more preferably satisfies Conditional Expression (5-2) below.

$$-1.3 < f/RRr < -0.2 \tag{5}$$

$$-1.2 < f/RRr < -0.3 \tag{5-1}$$

$$-1.1 < f/RRr < -0.3 \tag{5-2}$$

In a case where a thickness of the lens of the eyepiece lens 3 closest to the eyepoint side on the optical axis is denoted by dr, and the paraxial curvature radius of the lens surface of the eyepiece lens 3 closest to the eyepoint side is denoted by RRr, the observation optical system 5 preferably satisfies Conditional Expression (6) below. As an example, dr is illustrated in FIG. 2. Causing a corresponding value of Conditional Expression (6) not to be less than or equal to a lower limit thereof can suppress an increase in refractive power of the lens surface of the eyepiece lens 3 closest to the eyepoint side and thus, is advantageous for securing a high eyepoint. Causing the corresponding value of Conditional Expression (6) not to be greater than or equal to an upper limit thereof can suppress an excessive increase in thickness ratio, that is, the ratio of the thickness of the center portion to the thickness of the edge part portion in the lens, and thus, can contribute to the improvement of workability. In order to obtain more favorable characteristics, the observation optical system 5 more preferably satisfies Conditional Expression (6-1) below and still more preferably satisfies Conditional Expression (6-2) below.

$$-0.3 < dr/RRr < -0.01 \tag{6}$$

$$-0.28 < dr/RRr < -0.05 \tag{6-1}$$

$$-0.25 < dr/RRr < -0.08 \tag{6-2}$$

In a case where the focal length of the eyepiece lens 3 is denoted by f, and a combined focal length of the first lens L1 and the second lens L2 is denoted by f12, the observation optical system 5 preferably satisfies Conditional Expression (7) below. Causing a corresponding value of Conditional Expression (7) not to be less than or equal to a lower limit thereof can suppress a decrease in positive combined refractive power of the first lens L1 and the second lens L2 and thus, can suppress an increase in negative refractive power of the second lens L2. Accordingly, this is advantageous for correcting various aberrations such as the astigmatism and the field curvature. Causing the corresponding value of Conditional Expression (7) not to be greater than or equal to an upper limit thereof can suppress an increase in positive combined refractive power of the first lens L1 and the second lens L2 and thus, is advantageous for securing a wide apparent field of view and securing a high eyepoint. In order to obtain more favorable characteristics, the observation optical system 5 more preferably satisfies Conditional Expression (7-1) below and still more preferably satisfies Conditional Expression (7-2) below.

$$0.05 < f/f12 < 1.5 \quad (7)$$

$$0.1 < f/f12 < 1 \quad (7\text{-}1)$$

$$0.15 < f/f12 < 0.8 \quad (7\text{-}2)$$

In a case where the paraxial curvature radius of the surface of the second lens L2 on the display element side is denoted by R2f, and a paraxial curvature radius of a surface of the first lens L1 on the eyepoint side is denoted by R1r, the observation optical system 5 preferably satisfies Conditional Expression (8) below. Causing a corresponding value of Conditional Expression (8) not to be less than or equal to a lower limit thereof can suppress an excessive increase in refraction of an off-axis ray by the surface of the second lens L2 on the display element side with respect to refraction of the off-axis ray by the surface of the first lens L1 on the eyepoint side and thus, is advantageous for suppressing excessive correction of the lateral chromatic aberration. Causing the corresponding value of Conditional Expression (8) not to be greater than or equal to an upper limit thereof can suppress a decrease in refraction of the off-axis ray by the surface of the second lens L2 on the display element side with respect to the refraction of the off-axis ray by the surface of the first lens L1 on the eyepoint side and thus, is advantageous for suppressing insufficient correction of the lateral chromatic aberration. In order to obtain more favorable characteristics, the observation optical system 5 more preferably satisfies Conditional Expression (8-1) below and still more preferably satisfies Conditional Expression (8-2) below.

$$-0.2 < (R2f - R1r)/(R2f + Rh) < -0.01 \quad (8)$$

$$-0.18 < (R2f - R1r)/(R2f + Rh) < -0.015 \quad (8\text{-}1)$$

$$-0.15 < (R2f - R1r)/(R2f + Rh) < -0.02 \quad (8\text{-}2)$$

In a case where a paraxial curvature radius of a surface, on the display element side, of the lens of the eyepiece lens 3 closest to the eyepoint side is denoted by RRf, and a paraxial curvature radius of a surface, on the eyepoint side, of a lens adjacent to the display element side of the lens of the eyepiece lens 3 closest to the eyepoint side is denoted by RQr, the observation optical system 5 preferably satisfies Conditional Expression (9). In the example in FIG. 1, the lens of the eyepiece lens 3 closest to the eyepoint side corresponds to the fourth lens L4, and the lens adjacent to the display element side of the lens of the eyepiece lens 3 closest to the eyepoint side corresponds to the third lens L3. Causing a corresponding value of Conditional Expression (9) not to be less than or equal to a lower limit thereof can suppress an excessive increase in refraction of the off-axis ray by the surface, on the display element side, of the lens closest to the eyepoint side with respect to refraction of the off-axis ray by the surface of the adjacent lens on the eyepoint side and thus, is advantageous for correcting the spherical aberration and securing a high eyepoint. Causing the corresponding value of Conditional Expression (9) not to be greater than or equal to an upper limit thereof can suppress a decrease in refraction of the off-axis ray by the surface, on the display element side, of the lens closest to the eyepoint side with respect to the refraction of the off-axis ray by the surface of the adjacent lens on the eyepoint side and thus, is advantageous for suppressing the field curvature and the astigmatism. In order to obtain more favorable characteristics, the observation optical system 5 more preferably satisfies Conditional Expression (9-1) below and still more preferably satisfies Conditional Expression (9-2) below.

$$0.1 < (RRf - RQr)/(RRf + RQr) < 2 \quad (9)$$

$$0.2 < (RRf - RQr)/(RRf + RQr) < 1.78 \quad (9\text{-}1)$$

$$0.4 < (RRf - RQr)/(RRf + RQr) < 1.75 \quad (9\text{-}2)$$

In a case where a paraxial curvature radius of a surface of the second lens L2 on the eyepoint side is denoted by R2r, and the paraxial curvature radius of the surface of the second lens L2 on the display element side is denoted by R2f, the observation optical system 5 preferably satisfies Conditional Expression (10) below. Causing a corresponding value of Conditional Expression (10) not to be less than or equal to a lower limit thereof can suppress an increase in refraction of the ray by the surface of the second lens L2 on the eyepoint side and thus, is advantageous for suppressing the lateral chromatic aberration. Causing the corresponding value of Conditional Expression (10) not to be greater than or equal to an upper limit thereof can suppress an increase in refraction of the ray by the surface of the second lens L2 on the display element side and thus, is advantageous for suppressing the field curvature. In order to obtain more favorable characteristics, the observation optical system 5 more preferably satisfies Conditional Expression (10-1) below and still more preferably satisfies Conditional Expression (10-2) below.

$$0.1 < (R2r + R2f)/(R2r - R2f) < 1.6 \quad (10)$$

$$0.2 < (R2r + R2f)/(R2r - R2f) < 1.4 \quad (10\text{-}1)$$

$$0.3 < (R2r + R2f)/(R2r - R2f) < 1.2 \quad (10\text{-}2)$$

In a case where the focal length of the eyepiece lens 3 is denoted by f, and a focal length of the rear side lens group GR is denoted by fGR, the observation optical system 5 preferably satisfies Conditional Expression (11) below. Causing a corresponding value of Conditional Expression (11) not to be less than or equal to a lower limit thereof can suppress a decrease in positive refractive power of the rear side lens group GR and thus, is advantageous for suppressing the astigmatism and the spherical aberration. Causing the corresponding value of Conditional Expression (11) not to be greater than or equal to an upper limit thereof can suppress a decrease in refractive power of the eyepiece lens 3 and thus, is advantageous for securing a wide apparent field of view. In order to obtain more favorable characteristics, the observation optical system 5 more preferably satisfies Conditional Expression (11-1) below and still more preferably satisfies Conditional Expression (11-2) below.

$$0.5 < f/fGR < 1.5 \quad (11)$$

$$0.6 < f/fGR < 1.4 \quad (11\text{-}1)$$

$$0.7 < f/fGR < 1.3 \quad (11\text{-}2)$$

In a case where the focal length of the eyepiece lens 3 is denoted by f, and a focal length of the first lens L1 is denoted by f1, the observation optical system 5 preferably satisfies Conditional Expression (12) below. Causing a corresponding value of Conditional Expression (12) not to be less than or equal to a lower limit thereof can suppress a decrease in positive refractive power of the first lens L1 and thus, can suppress a relatively excessive influence of the negative refractive power of the second lens L2. Accordingly, this is advantageous for correcting the astigmatism and the field curvature. Causing the corresponding value of Conditional Expression (12) not to be greater than or equal to an upper limit thereof can suppress a decrease in refractive power of the eyepiece lens 3 and thus, is advantageous for securing a wide apparent field of view. In order to obtain more favorable characteristics, the observation optical system 5 more preferably satisfies Conditional Expression (12-1) below and still more preferably satisfies Conditional Expression (12-2) below.

$$0.5 < f/f1 < 1.9 \tag{12}$$

$$0.8 < f/f1 < 1.85 \tag{12-1}$$

$$1.2 < f/f1 < 1.8 \tag{12-2}$$

In a case where the focal length of the eyepiece lens 3 is denoted by f, and a focal length of a lens of the rear side lens group GR closest to the display element side is denoted by f3, the observation optical system 5 preferably satisfies Conditional Expression (13) below. Causing a corresponding value of Conditional Expression (13) not to be less than or equal to a lower limit thereof can suppress a decrease in refractive power of the lens of the rear side lens group GR closest to the display element side and thus, is advantageous for suppressing the astigmatism and the spherical aberration. Causing the corresponding value of Conditional Expression (13) not to be greater than or equal to an upper limit thereof can suppress a decrease in refractive power of the eyepiece lens 3 and thus, is advantageous for securing a wide apparent field of view. In order to obtain more favorable characteristics, the observation optical system 5 more preferably satisfies Conditional Expression (13-1) below and still more preferably satisfies Conditional Expression (13-2) below.

$$0.1 < f/f3 < 2 \tag{13}$$

$$0.15 < f/f3 < 1.5 \tag{13-1}$$

$$0.25 < f/f3 < 1.2 \tag{13-2}$$

In a case where the focal length of the first lens L1 is denoted by f1, and the focal length of the lens of the rear side lens group GR closest to the display element side is denoted by f3, the observation optical system 5 preferably satisfies Conditional Expression (14) below. Causing a corresponding value of Conditional Expression (14) not to be less than or equal to a lower limit thereof can suppress a decrease in refractive power of the third lens L3 and thus, is advantageous for suppressing the astigmatism and the spherical aberration. Causing the corresponding value of Conditional Expression (14) not to be greater than or equal to an upper limit thereof can suppress a decrease in positive refractive power of the first lens L1 and thus, can suppress a relatively excessive influence of the negative refractive power of the second lens L2. Accordingly, this is advantageous for correcting the astigmatism and the field curvature. In order to obtain more favorable characteristics, the observation optical system 5 more preferably satisfies Conditional Expression (14-1) below and still more preferably satisfies Conditional Expression (14-2) below.

$$0.01 < f1/f3 < 1.5 \tag{14}$$

$$0.05 < f1/f3 < 1 \tag{14-1}$$

$$0.1 < f1/f3 < 0.8 \tag{14-2}$$

In a case where the half value of the longest diameter of the display region 1a in the display element 1 is denoted by H, and the focal length of the first lens L1 is denoted by f1, the observation optical system 5 preferably satisfies Conditional Expression (15) below. Causing a corresponding value of Conditional Expression (15) not to be less than or equal to a lower limit thereof can suppress a decrease in positive refractive power of the first lens L1 and thus, can suppress a relatively excessive influence of the negative refractive power of the second lens L2. Accordingly, this is advantageous for correcting the astigmatism and the field curvature. Causing the corresponding value of Conditional Expression (15) not to be greater than or equal to an upper limit thereof is advantageous for suppressing the aberrations such as the field curvature. In order to obtain more favorable characteristics, the observation optical system 5 more preferably satisfies Conditional Expression (15-1) below and still more preferably satisfies Conditional Expression (15-2) below.

$$0.1 < H/f1 < 0.9 \tag{15}$$

$$0.2 < H/f1 < 0.8 \tag{15-1}$$

$$0.4 < H/f1 < 0.75 \tag{15-2}$$

In a case where the focal length of the first lens L1 is denoted by f1, and a focal length of the second lens L2 is denoted by f2, the observation optical system 5 preferably satisfies Conditional Expression (16) below. Causing a corresponding value of Conditional Expression (16) not to be less than or equal to a lower limit thereof can suppress an increase in negative refractive power of the second lens L2 and thus, is advantageous for correcting the astigmatism and the field curvature. Causing the corresponding value of Conditional Expression (16) not to be greater than or equal to an upper limit thereof can suppress a decrease in negative refractive power of the second lens L2 and a decrease in divergence of the ray heading toward the third lens L3 from the second lens L2. Thus, this is advantageous for size reduction in a total length direction in a case of securing a wide apparent field of view. In order to obtain more favorable characteristics, the observation optical system 5 more preferably satisfies Conditional Expression (16-1) below and still more preferably satisfies Conditional Expression (16-2) below.

$$-2.5 < f1/f2 < -0.1 \tag{16}$$

$$-2.1 < f1/f2 < -0.5 \tag{16-1}$$

$$-1.4 < f1/f2 < -0.7 \tag{16-2}$$

In a case where the focal length of the second lens L2 is denoted by f2, and the focal length of the lens of the rear side lens group GR closest to the display element side is denoted by f3, the observation optical system 5 preferably satisfies Conditional Expression (17) below. Causing a corresponding value of Conditional Expression (17) not to be less than or equal to a lower limit thereof can suppress a decrease in negative refractive power of the second lens L2 and a decrease in divergence of the ray heading toward the rear side lens group GR from the second lens L2. Thus, this is advantageous for size reduction in the total length direction in a case of securing a wide apparent field of view. Causing the corresponding value of Conditional Expression (17) not to be greater than or equal to an upper limit thereof can suppress a decrease in refractive power of the lens of the rear side lens group GR closest to the display element side and thus, is advantageous for suppressing the astigmatism and the spherical aberration. In order to obtain more favorable characteristics, the observation optical system 5 more preferably satisfies Conditional Expression (17-1) below and still more preferably satisfies Conditional Expression (17-2) below.

$$-3<f2/f3<-0.05 \quad (17)$$

$$-2<f2/f3<-0.1 \quad (17\text{-}1)$$

$$-0.7<f2/f3<-0.2 \quad (17\text{-}2)$$

In a case where the focal length of the eyepiece lens 3 is denoted by f, and the focal length of the second lens L2 is denoted by f2, the observation optical system 5 preferably satisfies Conditional Expression (18) below. Causing a corresponding value of Conditional Expression (18) not to be less than or equal to a lower limit thereof can suppress a decrease in negative refractive power of the second lens L2 and a decrease in divergence of the ray heading toward the rear side lens group GR from the second lens L2. Thus, this is advantageous for size reduction in the total length direction in a case of securing a wide apparent field of view. Causing the corresponding value of Conditional Expression (18) not to be greater than or equal to an upper limit thereof can suppress a decrease in refractive power of the eyepiece lens 3 and thus, is advantageous for securing a wide apparent field of view. In order to obtain more favorable characteristics, the observation optical system 5 more preferably satisfies Conditional Expression (18-1) below and still more preferably satisfies Conditional Expression (18-2) below.

$$0.1<f/|f2|<3 \quad (18)$$

$$0.5<f/|f2|<2 \quad (18\text{-}1)$$

$$1<f/|f2|<1.7 \quad (18\text{-}2)$$

In a case where the distance from the lens surface of the eyepiece lens 3 closest to the display element side to the lens surface of the eyepiece lens 3 closest to the eyepoint side on the optical axis is denoted by dL, and a sum of dL and an air conversion distance from a display surface of the display element 1 to a surface of the first lens L1 on the display element side on the optical axis is denoted by TL, the observation optical system 5 preferably satisfies Conditional Expression (19) below. Causing a corresponding value of Conditional Expression (19) not to be less than or equal to a lower limit thereof can suppress a steep angle of the ray passing through the eyepiece lens 3 and thus, is advantageous for the aberration correction. Causing the corresponding value of Conditional Expression (19) not to be greater than or equal to an upper limit thereof facilitates a decrease in focal length of the eyepiece lens 3 and thus, is advantageous for securing a wide apparent field of view. In order to obtain more favorable characteristics, the observation optical system 5 more preferably satisfies Conditional Expression (19-1) below and still more preferably satisfies Conditional Expression (19-2) below.

$$0.4<dL/TL<1 \quad (19)$$

$$0.45<dL/TL<0.9 \quad (19\text{-}1)$$

$$0.5<dL/TL<0.8 \quad (19\text{-}2)$$

In a case where a distance from the surface of the first lens L1 on the eyepoint side to a lens surface of the rear side lens group GR closest to the display element side on the optical axis is denoted by d13, and the focal length of the second lens L2 is denoted by f2, the observation optical system 5 preferably satisfies Conditional Expression (20) below. As an example, d13 is illustrated in FIG. 2. Causing a corresponding value of Conditional Expression (20) not to be less than or equal to a lower limit thereof can suppress a decrease in negative refractive power of the second lens L2 and a decrease in divergence of the ray heading toward the rear side lens group GR from the second lens L2. Thus, this is advantageous for size reduction in the total length direction in a case of securing a wide apparent field of view. Causing the corresponding value of Conditional Expression (20) not to be greater than or equal to an upper limit thereof can suppress an increase in negative refractive power of the second lens L2 and thus, is advantageous for correcting the astigmatism and the field curvature. In order to obtain more favorable characteristics, the observation optical system 5 more preferably satisfies Conditional Expression (20-1) below and still more preferably satisfies Conditional Expression (20-2) below.

$$0.1<d13/|f2|<1.5 \quad (20)$$

$$0.15<d13/|f2|<1 \quad (20\text{-}1)$$

$$0.2<d13/|f2|<0.6 \quad (20\text{-}2)$$

In a case where a paraxial curvature radius of the surface of the first lens L1 on the display element side is denoted by R1f, and the paraxial curvature radius of the surface of the first lens L1 on the eyepoint side is denoted by R1r, the observation optical system 5 preferably satisfies Conditional Expression (21) below. Causing a corresponding value of Conditional Expression (21) not to be less than or equal to a lower limit thereof can suppress a decrease in negative refractive power of the surface of the first lens L1 on the eyepoint side and thus, is advantageous for suppressing the field curvature. Causing the corresponding value of Conditional Expression (21) not to be greater than or equal to an upper limit thereof can suppress an increase in refractive power of the surface of the first lens L1 on the display element side and thus, is advantageous for suppressing a distortion. In order to obtain more favorable characteristics, the observation optical system 5 more preferably satisfies Conditional Expression (21-1) below and still more preferably satisfies Conditional Expression (21-2) below.

$$-2<(R1r+R1f)/(R1r-R1f)<-0.1 \quad (21)$$

$$-1.5<(R1r+R1f)/(R1r-R1f)<-0.2 \quad (21\text{-}1)$$

$$-1.3<(R1r+R1f)/(R1r-R1f)<-0.3 \quad (21\text{-}2)$$

In a case where a paraxial curvature radius of a surface, on the display element side, of the lens of the rear side lens group GR closest to the display element side is denoted by R3f, and a paraxial curvature radius of a surface, on the eyepoint side, of the lens of the rear side lens group GR closest to the display element side is denoted by R3r, the observation optical system 5 preferably satisfies Conditional Expression (22) below. Causing a corresponding value of Conditional Expression (22) not to be less than or equal to a lower limit thereof can suppress an excessive increase in refractive power of the surface, on the eyepoint side, of the lens of the rear side lens group GR closest to the display element side and thus, is advantageous for correcting the spherical aberration and securing a high eyepoint. Causing the corresponding value of Conditional Expression (22) not to be greater than or equal to an upper limit thereof can suppress a decrease in refractive power of the surface, on the eyepoint side, of the lens of the rear side lens group GR closest to the display element side and thus, is advantageous for suppressing the field curvature and the astigmatism. In order to obtain more favorable characteristics, the observation optical system 5 more preferably satisfies Conditional Expression (22-1) below and still more preferably satisfies Conditional Expression (22-2) below.

$$-8<(R3r+R3f)/(R3r-R3f)<-0.1 \quad (22)$$

$$-6<(R3r+R3f)/(R3r-R3f)<-0.2 \quad (22-1)$$

$$-4.5<(R3r+R3f)/(R3r-R3f)<-0.3 \quad (22-2)$$

In a case where the paraxial curvature radius of the surface, on the display element side, of the lens of the rear side lens group GR closest to the display element side is denoted by R3f, and the paraxial curvature radius of the surface of the second lens L2 on the eyepoint side is denoted by R2r, the observation optical system 5 preferably satisfies Conditional Expression (23) below. Causing a corresponding value of Conditional Expression (23) not to be less than or equal to a lower limit thereof can suppress an excessive increase in refraction of the off-axis ray by the surface, on the display element side, of the lens of the rear side lens group GR closest to the display element side with respect to refraction of the off-axis ray by the surface of the second lens L2 on the eyepoint side and thus, is advantageous for correcting the spherical aberration and securing a high eyepoint. Causing a corresponding value of Conditional Expression (23) not to be greater than or equal to an upper limit thereof can suppress a decrease in refraction of the off-axis ray by the surface, on the display element side, of the lens of the rear side lens group GR closest to the display element side with respect to the refraction of the off-axis ray by the surface of the second lens L2 on the eyepoint side and thus, is advantageous for suppressing the field curvature and the astigmatism. In order to obtain more favorable characteristics, the observation optical system 5 more preferably satisfies Conditional Expression (23-1) below and still more preferably satisfies Conditional Expression (23-2) below.

$$-2.5<(R3f-R2r)/(R3f+R2r)<1 \quad (23)$$

$$-2<(R3f-R2r)/(R3f+R2r)<0.8 \quad (23-1)$$

$$-1.7<(R3f-R2r)/(R3f+R2r)<0.65 \quad (23-2)$$

In a case where the thickness of the second lens L2 on the optical axis is denoted by d2, and an Abbe number of the second lens L2 based on the d line is denoted by v2, the observation optical system 5 preferably satisfies Conditional Expression (24) below. Here, d2 is in units of millimeters (mm). Causing a corresponding value of Conditional Expression (24) not to be less than or equal to a lower limit thereof can suppress insufficient correction in correcting the lateral chromatic aberration occurring in the first lens L1 using the second lens L2. Causing the corresponding value of Conditional Expression (24) not to be greater than or equal to an upper limit thereof can suppress excessive correction in correcting the lateral chromatic aberration occurring in the first lens L1 using the second lens L2. In order to obtain more favorable characteristics, the observation optical system 5 more preferably satisfies Conditional Expression (24-1) below and still more preferably satisfies Conditional Expression (24-2) below.

$$0.05<d2/v2<0.09 \quad (24)$$

$$0.055<d2/v2<0.088 \quad (24-1)$$

$$0.06<d2/v2<0.085 \quad (24-2)$$

In a case where the sum of the air conversion distance from the display surface of the display element 1 to the surface of the first lens L1 on the display element side on the optical axis and the distance from the lens surface of the eyepiece lens 3 closest to the display element side to the lens surface of the eyepiece lens 3 closest to the eyepoint side on the optical axis is denoted by TL, and the focal length of the second lens L2 is denoted by f2, the observation optical system 5 preferably satisfies Conditional Expression (25) below. Causing a corresponding value of Conditional Expression (25) not to be less than or equal to a lower limit thereof can suppress an increase in negative refractive power of the second lens L2 and thus, is advantageous for correcting the astigmatism and the field curvature. Causing the corresponding value of Conditional Expression (25) not to be greater than or equal to an upper limit thereof can suppress a decrease in negative refractive power of the second lens L2 and a decrease in divergence of the ray heading toward the rear side lens group GR from the second lens L2. Thus, this is advantageous for size reduction in the total length direction in a case of securing a wide apparent field of view. In order to obtain more favorable characteristics, the observation optical system 5 more preferably satisfies Conditional Expression (25-1) below and still more preferably satisfies Conditional Expression (25-2) below.

$$-4<TL/f2<-0.5 \quad (25)$$

$$-3.5<TL/f2<-0.55 \quad (25-1)$$

$$-3<TL/f2<-1.5 \quad (25-2)$$

In a case where a distance from the surface of the first lens L1 on the eyepoint side to the surface of the second lens L2 on the display element side on the optical axis is denoted by d12, and a sum of the air conversion distance from the display surface of the display element 1 to the surface of the first lens L1 on the display element side on the optical axis and a distance from the surface of the first lens L1 on the display element side to the surface of the second lens L2 on the eyepoint side on the optical axis is denoted by T2, the observation optical system 5 preferably satisfies Conditional Expression (26) below. As an example, d12 is illustrated in FIG. 2. Causing a corresponding value of Conditional Expression (26) not to be less than or equal to a lower limit thereof can suppress a decrease in refractive power of the eyepiece lens 3 and thus, is advantageous for securing a wide apparent field of view. Causing the corresponding value of Conditional Expression (26) not to be greater than or equal to an upper limit thereof is advantageous for reducing the total length. In order to obtain more favorable characteristics, the observation optical system 5 more preferably satisfies Conditional Expression (26-1) below and still more preferably satisfies Conditional Expression (26-2) below.

$$0.01<d12/T2<0.5 \quad (26)$$

$$0.02<d12/T2<0.4 \quad (26-1)$$

$$0.05<d12/T2<0.2 \quad (26-2)$$

In a case where the distance from the surface of the first lens L1 on the eyepoint side to the surface of the second lens L2 on the display element side on the optical axis is denoted by d12, and the thickness of the second lens L2 on the optical axis is denoted by d2, the observation optical system 5 preferably satisfies Conditional Expression (27) below. Causing a corresponding value of Conditional Expression (27) not to be less than or equal to a lower limit thereof facilitates securing of a distance for increasing a luminous flux diameter and thus, is advantageous for increasing the apparent field of view. Causing the corresponding value of Conditional Expression (27) not to be greater than or equal to an upper limit thereof facilitates securing of a sufficient thickness of the second lens L2 and thus, is advantageous for correcting the lateral chromatic aberration. In order to obtain more favorable characteristics, the observation optical system 5 more preferably satisfies Conditional Expression (27-1) below and still more preferably satisfies Conditional Expression (27-2) below.

$$0.5 < d12/d2 < 3.5 \tag{27}$$

$$0.6 < d12/d2 < 3 \tag{27-1}$$

$$0.7 < d12/d2 < 2.5 \tag{27-2}$$

In a case where an air conversion distance from the display surface of the display element 1 to the surface of the first lens L1 on the display element side on the optical axis is denoted by d01, and the focal length of the eyepiece lens 3 is denoted by f, the observation optical system 5 preferably satisfies Conditional Expression (28) below. Causing a corresponding value of Conditional Expression (28) not to be less than or equal to a lower limit thereof can suppress a decrease in refractive power of the eyepiece lens 3 and thus, is advantageous for securing a wide apparent field of view. Causing the corresponding value of Conditional Expression (28) not to be greater than or equal to an upper limit thereof is advantageous for reducing the total length. In order to obtain more favorable characteristics, the observation optical system 5 more preferably satisfies Conditional Expression (28-1) below and still more preferably satisfies Conditional Expression (28-2) below.

$$0.1 < d01/f < 0.8 \tag{28}$$

$$0.18 < d01/f < 0.7 \tag{28-1}$$

$$0.3 < d01/f < 0.55 \tag{28-2}$$

In a case where the distance from the surface of the first lens L1 on the eyepoint side to the surface of the second lens L2 on the display element side on the optical axis is denoted by d12, and the sum of the air conversion distance from the display surface of the display element 1 to the surface of the first lens L1 on the display element side on the optical axis and the distance from the lens surface of the eyepiece lens 3 closest to the display element side to the lens surface of the eyepiece lens 3 closest to the eyepoint side on the optical axis is denoted by TL, the observation optical system 5 preferably satisfies Conditional Expression (29) below. Causing a corresponding value of Conditional Expression (29) not to be less than or equal to a lower limit thereof can suppress a decrease in refractive power of the eyepiece lens 3 and thus, is advantageous for securing a wide apparent field of view. Causing the corresponding value of Conditional Expression (29) not to be greater than or equal to an upper limit thereof can secure the total length of an appropriate length for bending the diverging ray to converge and thus, can prevent a steep change in angle of the ray. Accordingly, this is advantageous for correcting the aberrations such as the chromatic aberration and the field curvature. In order to obtain more favorable characteristics, the observation optical system 5 more preferably satisfies Conditional Expression (29-1) below and still more preferably satisfies Conditional Expression (29-2) below.

$$0.01 < d12/TL < 0.3 \tag{29}$$

$$0.015 < d12/TL < 0.15 \tag{29-1}$$

$$0.025 < d12/TL < 0.12 \tag{29-2}$$

In a case where the half value of the longest diameter of the display region 1a in the display element 1 is denoted by H, and the sum of the air conversion distance from the display surface of the display element 1 to the surface of the first lens L1 on the display element side on the optical axis and the distance from the lens surface of the eyepiece lens 3 closest to the display element side to the lens surface of the eyepiece lens 3 closest to the eyepoint side on the optical axis is denoted by TL, the observation optical system 5 preferably satisfies Conditional Expression (30) below. Causing a corresponding value of Conditional Expression (30) not to be less than or equal to a lower limit thereof can suppress a decrease in refractive power of the eyepiece lens 3 and thus, is advantageous for securing a wide apparent field of view. Causing the corresponding value of Conditional Expression (30) not to be greater than or equal to an upper limit thereof is advantageous for suppressing the aberrations such as the field curvature. In order to obtain more favorable characteristics, the observation optical system 5 more preferably satisfies Conditional Expression (30-1) below and still more preferably satisfies Conditional Expression (30-2) below.

$$0.1 < H/TL < 0.5 \tag{30}$$

$$0.15 < H/TL < 0.4 \tag{30-1}$$

$$0.2 < H/TL < 0.3 \tag{30-2}$$

In a case where the half value of the longest diameter of the display region 1a in the display element 1 is denoted by H, and the focal length of the second lens L2 is denoted by f2, the observation optical system 5 preferably satisfies Conditional Expression (31) below. Causing a corresponding value of Conditional Expression (31) not to be less than or equal to a lower limit thereof can suppress an increase in negative refractive power of the second lens L2 and thus, is advantageous for correcting the astigmatism and the field curvature. Causing the corresponding value of Conditional Expression (31) not to be greater than or equal to an upper limit thereof can suppress a decrease in negative refractive power of the second lens L2 and a decrease in divergence of the ray heading toward the rear side lens group GR from the second lens L2. Thus, this is advantageous for size reduction in the total length direction in a case of securing a wide apparent field of view. In order to obtain more favorable characteristics, the observation optical system 5 more preferably satisfies Conditional Expression (31-1) below and still more preferably satisfies Conditional Expression (31-2) below.

$$-1.2 < H/f2 < -0.5 \tag{31}$$

$$-1 < H/f2 < -0.4 \tag{31-1}$$

$$-0.7 < H/f2 < -0.3 \tag{31-2}$$

In a case where the half value of the longest diameter of the display region 1a in the display element 1 is denoted by H, and the focal length of the lens of the rear side lens group GR closest to the display element side is denoted by f3, the observation optical system 5 preferably satisfies Conditional Expression (32) below. Causing a corresponding value of Conditional Expression (32) not to be less than or equal to a lower limit thereof can suppress a decrease in refractive power of the lens of the rear side lens group GR closest to the display element side and thus, is advantageous for suppressing the astigmatism and the spherical aberration.

Causing the corresponding value of Conditional Expression (32) not to be greater than or equal to an upper limit thereof is advantageous for suppressing the aberrations such as the field curvature. In order to obtain more favorable characteristics, the observation optical system 5 more preferably satisfies Conditional Expression (32-1) below and still more preferably satisfies Conditional Expression (32-2) below.

$$0.03 < H/f3 < 0.8 \tag{32}$$

$$0.05 < H/f3 < 0.6 \tag{32-1}$$

$$0.1 < H/f3 < 0.4 \tag{32-2}$$

In a case where the half value of the longest diameter of the display region 1a in the display element 1 is denoted by H, and the focal length of the rear side lens group GR is denoted by fGR, the observation optical system 5 preferably satisfies Conditional Expression (33) below. Causing a corresponding value of Conditional Expression (33) not to be less than or equal to a lower limit thereof can suppress a decrease in refractive power of the rear side lens group GR and thus, is advantageous for suppressing the astigmatism and the spherical aberration. Causing the corresponding value of Conditional Expression (33) not to be greater than or equal to an upper limit thereof is advantageous for suppressing the aberrations such as the field curvature. In order to obtain more favorable characteristics, the observation optical system 5 more preferably satisfies Conditional Expression (33-1) below and still more preferably satisfies Conditional Expression (33-2) below.

$$0.01 < H/fGR < 0.8 \tag{33}$$

$$0.05 < H/fGR < 0.6 \tag{33-1}$$

$$0.25 < H/fGR < 0.5 \tag{33-2}$$

Preferable configurations and available configurations in the embodiment described above are available in any combination thereof and are preferably employed appropriately selectively in accordance with required specifications. For example, the observation optical system 5 of one preferable aspect in which the above configurations are combined comprises the display element 1 and the eyepiece lens 3 arranged on the eyepoint side of the display element 1, in which the eyepiece lens 3 consists of the first lens L1 having positive refractive power, the second lens L2 having negative refractive power, and the rear side lens group GR including two or more lenses in order from the display element side to the eyepoint side, and the observation optical system 5 satisfies Conditional Expressions (1), (2), and (3).

An increased need for size reduction of a digital camera also requires both of size reduction and high specifications to be established in an observation optical system for a viewfinder. High specifications require a particularly wide apparent field of view. However, increasing the apparent field of view in a state where size reduction is maintained results in a lens configuration in which a large amount of a material having a high refractive index is used. Thus, it is difficult to employ the aspherical lens, and it is difficult to control the aberrations. In addition, since the material having a high refractive index causes high dispersion, increasing the material having a high refractive index makes it difficult to correct the lateral chromatic aberration. Therefore, employing the preferable one aspect enables a configuration also including a material having a low refractive index. Accordingly, since a large number of aspherical surfaces can be used, it is possible to implement both of size reduction and high specifications while favorably controlling the aberrations.

Next, examples of the observation optical system according to the embodiment of the present disclosure will be described with reference to the drawings. Reference numerals attached to constituents of a cross-sectional view of each example are independently used for each example in order to avoid complication of the description and the drawing caused by an increase in number of digits of the reference numerals. Accordingly, a common reference numeral attached in drawings of different examples does not necessarily denote a common configuration.

Example 1

The configuration of the observation optical system 5 of Example 1 is illustrated in FIG. 1 and FIG. 2, and an illustration method and the configuration are described above. Thus, duplicate description will be partially omitted here. The eyepiece lens 3 comprised in the observation optical system 5 of Example 1 consists of four lenses of the first lens L1 to the fourth lens L4 in order from the display element side to the eyepoint side. The first lens L1 is a positive lens having a biconvex shape in a paraxial region. The second lens L2 is a negative lens having a biconcave shape in a paraxial region. The third lens L3 is a positive lens having a meniscus shape of which a concave surface faces toward the display element side in a paraxial region. The fourth lens L4 is a positive lens having a meniscus shape of which a concave surface faces toward the display element side in a paraxial region. All of the first lens L1 to the fourth lens L4 are non-cemented single lenses. Both surfaces of all of the first lens L1 to the fourth lens L4 are aspherical surfaces. In the diopter adjustment, the four lenses of the first lens L1 to the fourth lens L4 move as a single body.

For the observation optical system 5 of Example 1, basic lens data is shown in Table 1, specifications are shown in Table 2, variable surface spacing is shown in Table 3, and aspherical coefficients are shown in Table 4.

Table 1 is disclosed as follows. The column Sn shows a surface number of each surface in a case where a surface on which the display region 1a of the display element 1 is arranged is referred to as a first surface, and the number is increased by one at a time toward the eyepoint side. In Table 1, the display element 1, the optical member 2, the optical member 4, and the eyepoint EP are also disclosed, and a surface number and a word (EP) are disclosed in the field of Sn of a surface corresponding to the eyepoint EP. The column R shows a curvature radius of each surface. A sign of a curvature radius of a surface having a shape of a convex surface facing toward the display element side is positive. A sign of a curvature radius of a surface having a shape of a convex surface facing toward the eyepoint side is negative. A * mark is attached to a surface number of an aspherical surface, and a numerical value of a paraxial curvature radius is disclosed in the field of the curvature radius of the aspherical surface.

The column D shows surface spacing between each surface and a surface adjacent to the eyepoint side thereof on the optical axis. Variable surface spacing in the diopter adjustment is disclosed by using a symbol DD[ ] and attaching a surface number on the display element side of the spacing within [ ]. The column Nd shows a refractive index of each constituent at the d line. The column vd shows an Abbe number of each constituent based on the d line.

Table 2 shows the focal length f of the eyepiece lens 3 at each diopter and the apparent field of view at a full angle of view. In the field of the diopter, a unit diopter is abbreviated to dpt, and this abbreviation method also applies to Table 3. In the field of the apparent field of view, (°) means that a unit is degree. In addition, Table 2 shows the half value H of the longest diameter of the display region 1a in the display element 1.

Table 3 shows a value of the variable surface spacing at each diopter. The diopter adjustment can be performed on the observation optical system 5 of Example 1 within a range of −5.5 dpt to +3.5 dpt by moving the eyepiece lens 3 in the optical axis direction as a single body.

In Table 4, the row Sn shows the surface number of the aspherical surface. The rows KA and Am (m=4, 6, 8, 10, . . . 20) show numerical values of the aspherical coefficients for each aspherical surface. In Table 4, "E±n" (n: integer) in the numerical values of the aspherical coefficients means "×10$^{±n}$". KA and Am are aspherical coefficients in an aspheric equation represented by the following equation.

$$Zd = C \times h^2 / \{1 + (1 - KA \times C^2 \times h^2)^{1/2}\} + \Sigma Am \times h^m$$

where
Zd: a depth of the aspherical surface (a length of a vertical line drawn from a point on the aspherical surface at a height h down to a plane that is tangential to an aspherical surface apex and is perpendicular to the optical axis Z)
h: a height (a distance from the optical axis Z to the lens surface)
C: a reciprocal of the paraxial curvature radius
KA and Am: aspherical coefficients
In the aspheric equation, Σ means a total sum related to m.

In data of each table, while degree is used as a unit of angle, and millimeter (mm) is used as a unit of length, the optical system can also be used by proportionally increasing or proportionally reducing the optical system. Thus, other appropriate units can also be used. In addition, in each table shown below, numerical values rounded in a predetermined number of digits are disclosed.

TABLE 1

Example 1

| Sn | R | D | Nd | νd |
|---|---|---|---|---|
| 1 | ∞ | 0.7000 | 1.51900 | 64.90 |
| 2 | ∞ | 4.0000 | | |
| 3 | ∞ | 0.5000 | 1.51900 | 64.90 |
| 4 | ∞ | DD[4] | | |
| *5 | 26.6951 | 6.0777 | 1.76968 | 49.39 |
| *6 | −10.5273 | 1.3526 | | |
| *7 | −9.9575 | 1.8026 | 1.63351 | 23.63 |
| *8 | 74.5496 | 1.1100 | | |
| *9 | −17.1160 | 4.8426 | 1.53500 | 55.73 |
| *10 | −12.1495 | 0.3000 | | |
| *11 | −114.0505 | 4.1810 | 1.53500 | 55.73 |
| *12 | −17.9565 | DD[12] | | |
| 13 | ∞ | 0.8000 | 1.49023 | 57.50 |
| 14 | ∞ | 15.0000 | | |
| 15 (EP) | ∞ | | | |

TABLE 2

Example 1

| Diopter | −1 dpt | −5.5 dpt | +3.5 dpt |
|---|---|---|---|
| f | 17.44 | 17.44 | 17.44 |
| Apparent Field of View (°) | 39.57 | 37.44 | 41.33 |
| H | 6.43 | | |

TABLE 3

Example 1

| Diopter | −1 dpt | −5.5 dpt | +3.5 dpt |
|---|---|---|---|
| DD[4] | 3.0018 | 1.6433 | 4.3603 |
| DD[12] | 1.6685 | 3.0270 | 0.3100 |

TABLE 4

Example 1

| Sn | 5 | 6 | 7 | 8 | 9 | 10 |
|---|---|---|---|---|---|---|
| KA | 1.0000000E+00 | 1.0000000E+00 | 1.0000000E+00 | 1.0000000E+00 | 1.0000000E+00 | 1.0000000E+00 |
| A4 | −2.2215025E−04 | 9.9635493E−05 | −5.5763504E−05 | −1.2080732E−04 | 3.7526476E−04 | 5.9275989E−05 |
| A6 | −2.1984564E−07 | 4.3890891E−06 | 9.1770418E−06 | 6.4557390E−07 | −7.8645036E−07 | 3.1032142E−06 |
| A8 | 1.4022065E−07 | −9.9533195E−08 | −2.4111420E−07 | −3.4873291E−09 | −2.3256841E−09 | −1.8330736E−08 |
| A10 | −6.1143437E−09 | 6.8353377E−10 | 3.4920385E−09 | 1.7459234E−11 | −1.3732449E−11 | −8.6206603E−11 |
| A12 | 8.9077665E−11 | 1.0443401E−11 | −1.2655313E−11 | 1.8349929E−13 | −5.0800256E−13 | 7.3443197E−13 |
| A14 | 7.7043860E−13 | −7.4610921E−14 | −3.2531904E−13 | −3.3536051E−15 | 3.5587135E−15 | 4.3274512E−15 |
| A16 | −3.7728245E−14 | −1.9808673E−15 | 2.0231416E−15 | −1.1294329E−17 | 1.9885534E−17 | 4.1566534E−18 |
| A18 | 4.0369146E−16 | 2.0337601E−17 | 3.8147459E−17 | 3.0323927E−19 | 8.6231155E−21 | −5.0259859E−19 |
| A20 | −1.4404515E−18 | −2.0805734E−20 | −3.2153155E−19 | −1.0857499E−21 | −8.4287271E−22 | 2.2612567E−21 |

| Sn | 11 | 12 |
|---|---|---|
| KA | 1.0000000E+00 | 1.0000000E+00 |
| A4 | −1.7046978E−04 | −6.4589340E−05 |
| A6 | 1.4398468E−06 | −8.3599198E−07 |
| A8 | −1.9447871E−08 | 1.5473051E−08 |
| A10 | 1.7006082E−10 | −7.5163931E−11 |
| A12 | −4.2335586E−14 | −1.6411089E−13 |
| A14 | −5.5268685E−15 | 4.6715948E−15 |
| A16 | 1.5603745E−17 | −1.2461897E−17 |
| A18 | −3.2285316E−20 | −1.3166485E−19 |
| A20 | 2.7683120E−22 | 6.3236494E−22 |

Figure 3:
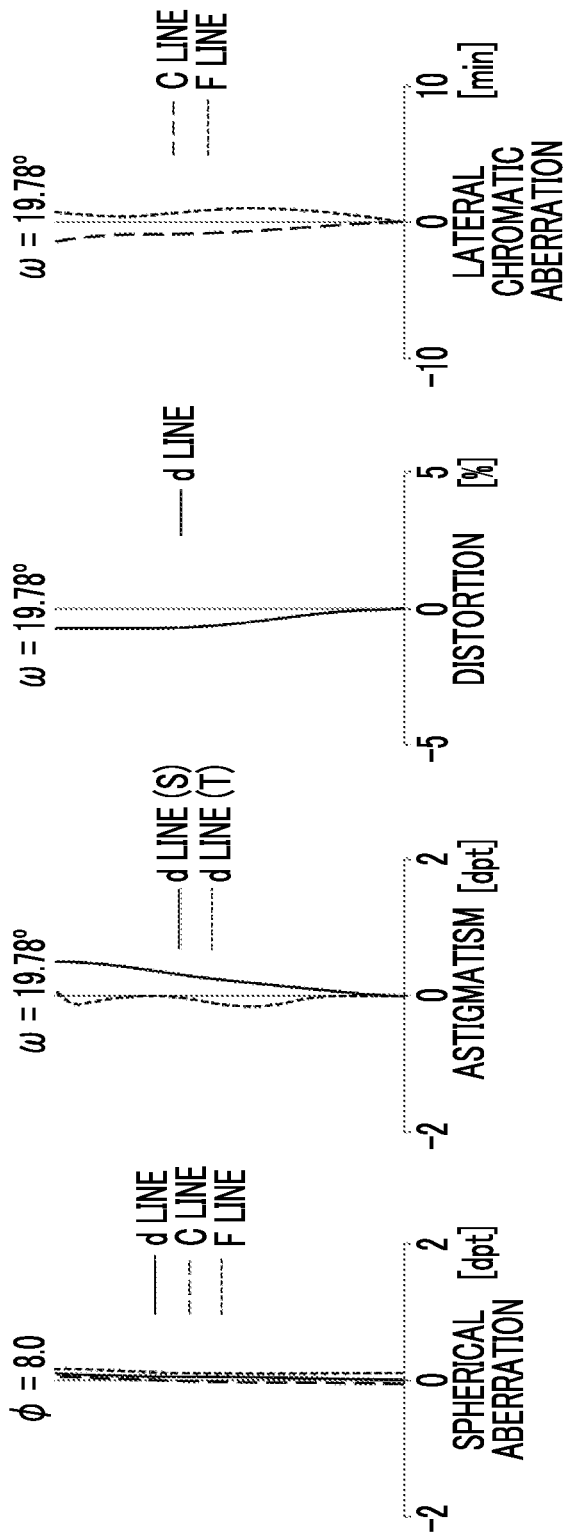
FIG. 3 illustrates various aberration diagrams of the observation optical system of Example 1.

FIG. 3 illustrates various aberration diagrams of the observation optical system 5 of Example 1 in a state where the diopter is −1 diopter. In FIG. 3, the spherical aberration, the astigmatism, the distortion, and the lateral chromatic aberration are illustrated in order from the left. In the spherical aberration diagram, aberrations for the d line, the C line, and the F line are illustrated by a solid line, a long broken line, and a short broken line, respectively. In the astigmatism diagram, the aberration for the d line in a sagittal direction is illustrated by a solid line, and the aberration for the d line in a tangential direction is illustrated by a short broken line. In the distortion diagram, the aberration for the d line is illustrated by a solid line. In the lateral chromatic aberration diagram, the aberrations for the C line and the F line are illustrated by a long broken line and a short broken line, respectively. The unit dpt on a horizontal axis of the spherical aberration diagram and the astigmatism diagram denotes diopter. The unit min on a horizontal axis of the lateral chromatic aberration diagram denotes a minute of angle. In the spherical aberration diagram, a diameter of the eyepoint EP in units of millimeters (mm) is shown after "Φ=". In other aberration diagrams, a value of the apparent field of view at a half angle of view is shown after "ω=".

Symbols, meanings, disclosure methods, and illustration methods of each data related to Example 1 are the same as in the following examples unless otherwise specified. Thus, duplicate description will be omitted below.

Example 2

Figure 4:
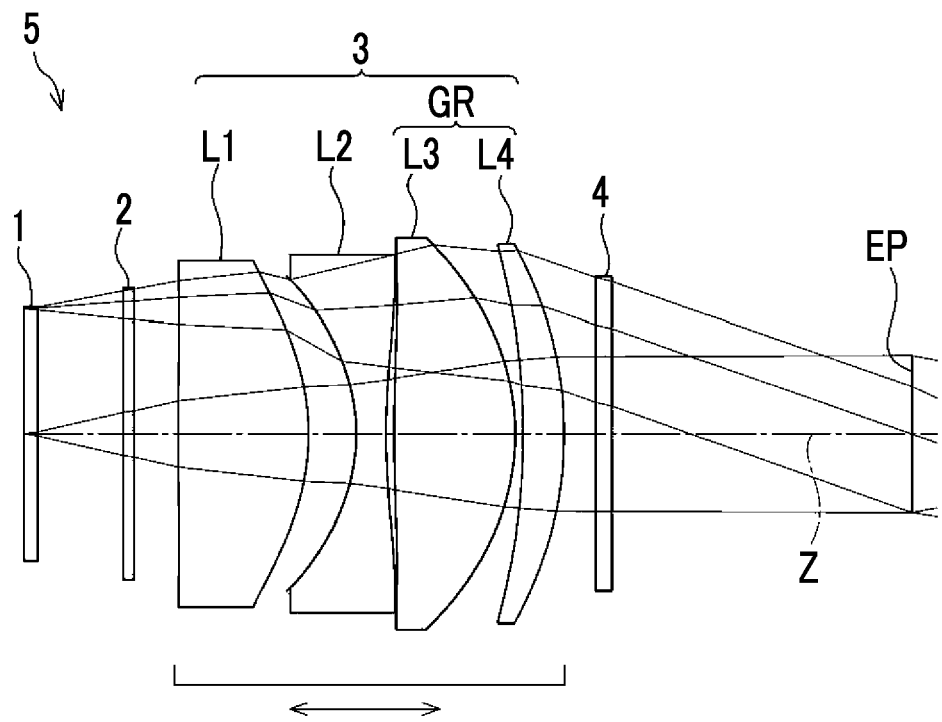
FIG. 4 is a cross-sectional view illustrating a configuration and luminous flux of an observation optical system of Example 2.

FIG. 4 illustrates a configuration and luminous flux of the observation optical system 5 of Example 2. The observation optical system 5 of Example 2 comprises the display element 1, the optical member 2, the eyepiece lens 3, and the optical member 4 in order from the display element side to the eyepoint side.

The eyepiece lens 3 consists of four lenses of the first lens L1 to the fourth lens L4 in order from the display element side to the eyepoint side. The rear side lens group GR consists of the third lens L3 and the fourth lens L4. The first lens L1 is a positive lens having a biconvex shape in a paraxial region. The second lens L2 is a negative lens having a biconcave shape in a paraxial region. The third lens L3 is a positive lens having a biconvex shape in a paraxial region. The fourth lens L4 is a positive lens having a meniscus shape of which a concave surface faces toward the display element side. All of the first lens L1 to the fourth lens L4 are non-cemented single lenses. Both surfaces of all of the first lens L1 to the third lens L3 are aspherical surfaces. In the diopter adjustment, the four lenses of the first lens L1 to the fourth lens L4 move as a single body.

Figure 5:
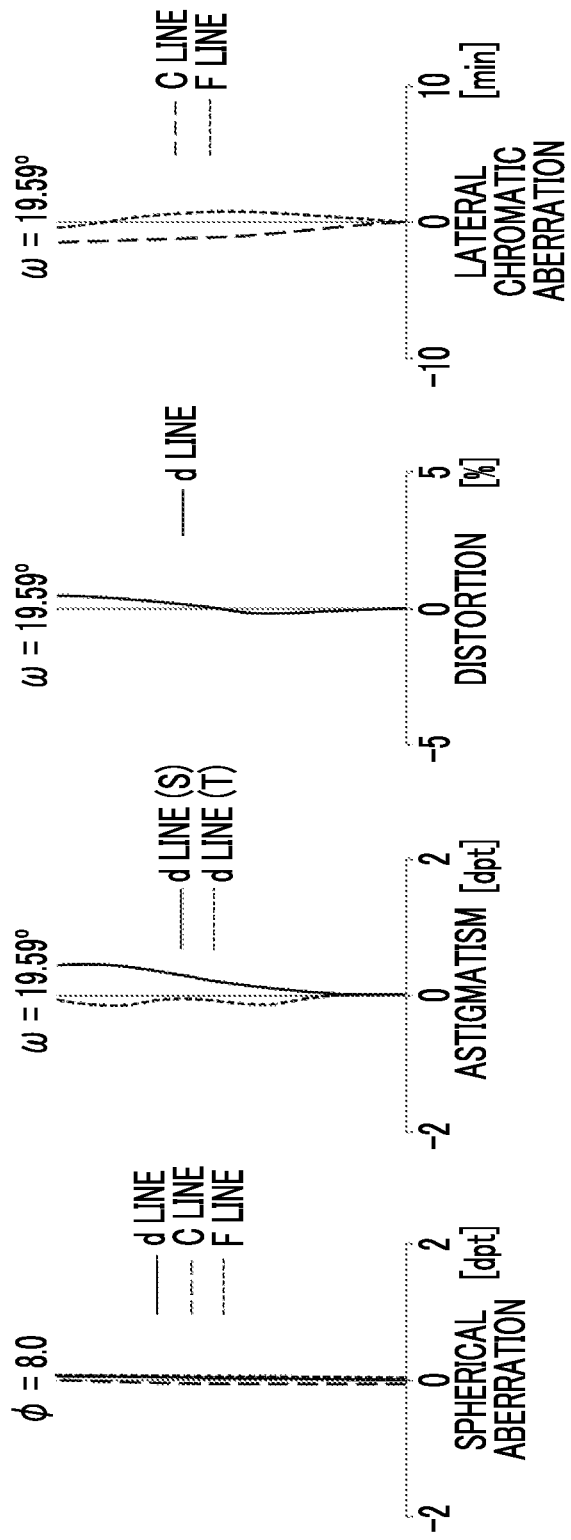
FIG. 5 illustrates various aberration diagrams of the observation optical system of Example 2.

For the observation optical system 5 of Example 2, basic lens data is shown in Table 5, specifications are shown in Table 6, variable surface spacing is shown in Table 7, aspherical coefficients are shown in Table 8, and various aberration diagrams in a state where the diopter is −1 diopter are illustrated in FIG. 5.

TABLE 5

Example 2

| Sn | R | D | Nd | nd |
|---|---|---|---|---|
| 1 | ∞ | 0.7000 | 1.51680 | 64.20 |
| 2 | ∞ | 4.3000 | | |
| 3 | ∞ | 0.5000 | 1.49023 | 57.49 |

TABLE 5-continued

Example 2

| Sn | R | D | Nd | nd |
|---|---|---|---|---|
| 4 | ∞ | DD[4] | | |
| *5 | 91.9504 | 6.5000 | 1.85108 | 40.12 |
| *6 | −12.1724 | 2.3846 | | |
| *7 | −9.5278 | 1.5000 | 1.63351 | 23.63 |
| *8 | 35.3618 | 0.4068 | | |
| *9 | 82.7152 | 6.0553 | 1.53389 | 55.98 |
| *10 | −12.3152 | 0.4007 | | |
| 11 | −35.9528 | 2.0559 | 1.77250 | 49.60 |
| 12 | −19.7552 | DD[12] | | |
| 13 | ∞ | 0.8000 | 1.49023 | 57.50 |
| 14 | ∞ | 15.0000 | | |
| 15 (EP) | ∞ | | | |

TABLE 6

Example 2

| Diopter | −1 dpt | −5.5 dpt | +3.5 dpt |
|---|---|---|---|
| f | 17.69 | 17.69 | 17.69 |
| Apparent Field of View (°) | 39.18 | 37.98 | 40.15 |
| H | 6.34 | | |

TABLE 7

Example 2

| Diopter | −1 dpt | 5.5 dpt | +3.5 dpt |
|---|---|---|---|
| DD[4] | 2.2083 | 1.1320 | 3.2847 |
| DD[12] | 1.5763 | 2.6527 | 0.5000 |

TABLE 8

Example 2

| Sn | 5 | 6 | 7 |
|---|---|---|---|
| KA | 1.0000000E+00 | 1.0000000E+00 | 1.0000000E+00 |
| A4 | −1.5889820E−04 | 1.2128039E−04 | 2.5922141E−04 |
| A6 | 3.2745187E−06 | 8.2161262E−07 | −3.2763053E−06 |
| A8 | −4.5964816E−08 | −3.7385111E−08 | 6.4545393E−08 |
| A10 | −1.9359753E−09 | 5.9153245E−10 | −3.5131575E−10 |
| A12 | 6.5481398E−11 | 1.5646000E−12 | −2.8102921E−12 |
| A14 | 4.4135050E−13 | −3.4729364E−14 | 5.1327458E−14 |
| A16 | −3.7601848E−14 | 2.2612048E−17 | 8.0623898E−17 |
| A18 | 4.9174793E−16 | −9.8053636E−18 | −1.2428993E−17 |
| A20 | −2.0659462E−18 | 9.9458273E−20 | 1.1710240E−19 |

| Sn | 8 | 9 | 10 |
|---|---|---|---|
| KA | 1.0000000E+00 | 1.0000000E+00 | 1.0000000E+00 |
| A4 | −1.1410979E−04 | −4.9178457E−05 | 5.0224682E−05 |
| A6 | −1.6252739E−07 | −3.5719720E−07 | −3.2340844E−07 |
| A8 | 1.8393313E−09 | 1.5222985E−09 | 7.1973686E−09 |
| A10 | 1.9599303E−11 | 1.8693770E−11 | −4.5861830E−11 |
| A12 | 1.8371722E−14 | −4.5007505E−14 | −3.6016502E−14 |
| A14 | −3.7741434E−15 | 3.6557257E−16 | 2.3328402E−15 |
| A16 | 1.9705020E−17 | 4.9044592E−18 | −8.4468819E−18 |
| A18 | 1.0328796E−19 | −2.1638071E−20 | 1.8924209E−20 |
| A20 | −1.0341988E−21 | −3.2863725E−22 | 5.0272287E−22 |

Example 3

Figure 6:
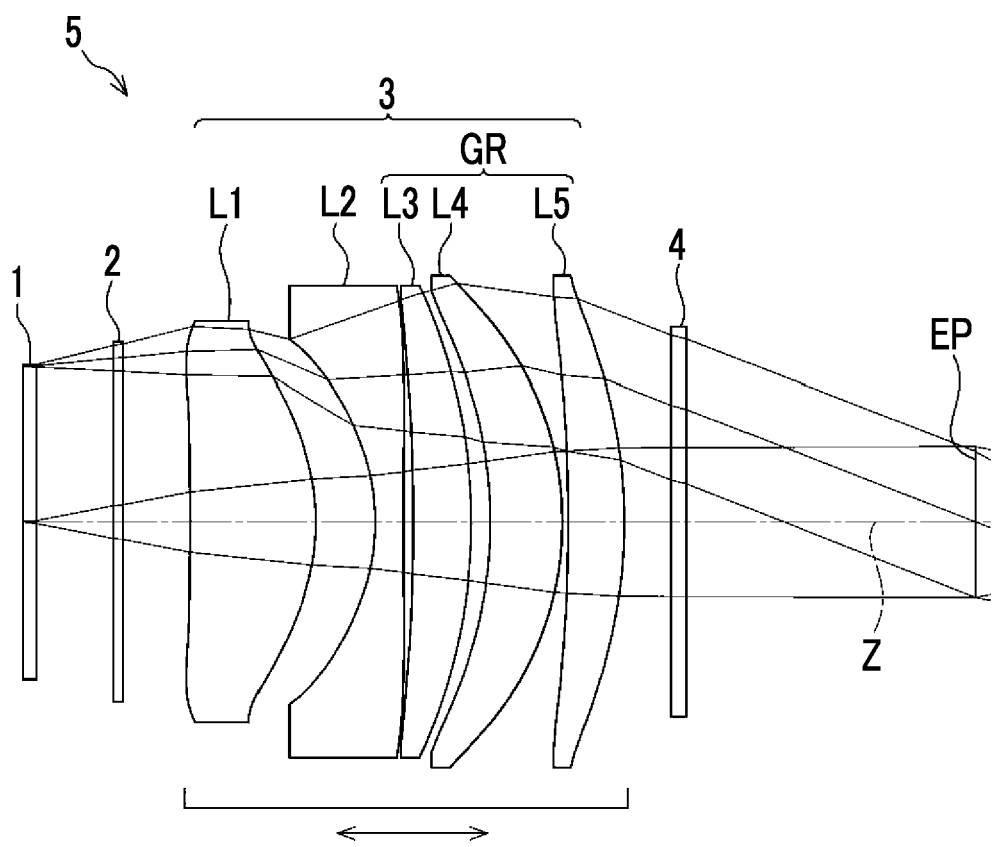
FIG. 6 is a cross-sectional view illustrating a configuration and luminous flux of an observation optical system of Example 3.

FIG. 6 illustrates a configuration and luminous flux of the observation optical system 5 of Example 3. The observation optical system 5 of Example 3 comprises the display element 1, the optical member 2, the eyepiece lens 3, and the optical member 4 in order from the display element side to the eyepoint side.

The eyepiece lens 3 consists of five lenses of the first lens L1 to a fifth lens L5 in order from the display element side to the eyepoint side. The rear side lens group GR consists of the third lens L3, the fourth lens L4, and the fifth lens L5. The first lens L1 is a positive lens having a meniscus shape of which a concave surface faces toward the display element side in a paraxial region. The second lens L2 is a negative lens having a biconcave shape in a paraxial region. The third lens L3 is a positive lens having a meniscus shape of which a concave surface faces toward the display element side. The fourth lens L4 and the fifth lens L5 are positive lenses having a meniscus shape of which a concave surface faces toward the display element side in a paraxial region. All of the first lens L1 to the fifth lens L5 are single lenses. Both surfaces of all of the first lens L1, the second lens L2, the fourth lens L4, and the fifth lens L5 are aspherical surfaces. In the diopter adjustment, the five lenses of the first lens L1 to the fifth lens L5 move as a single body.

Figure 7:
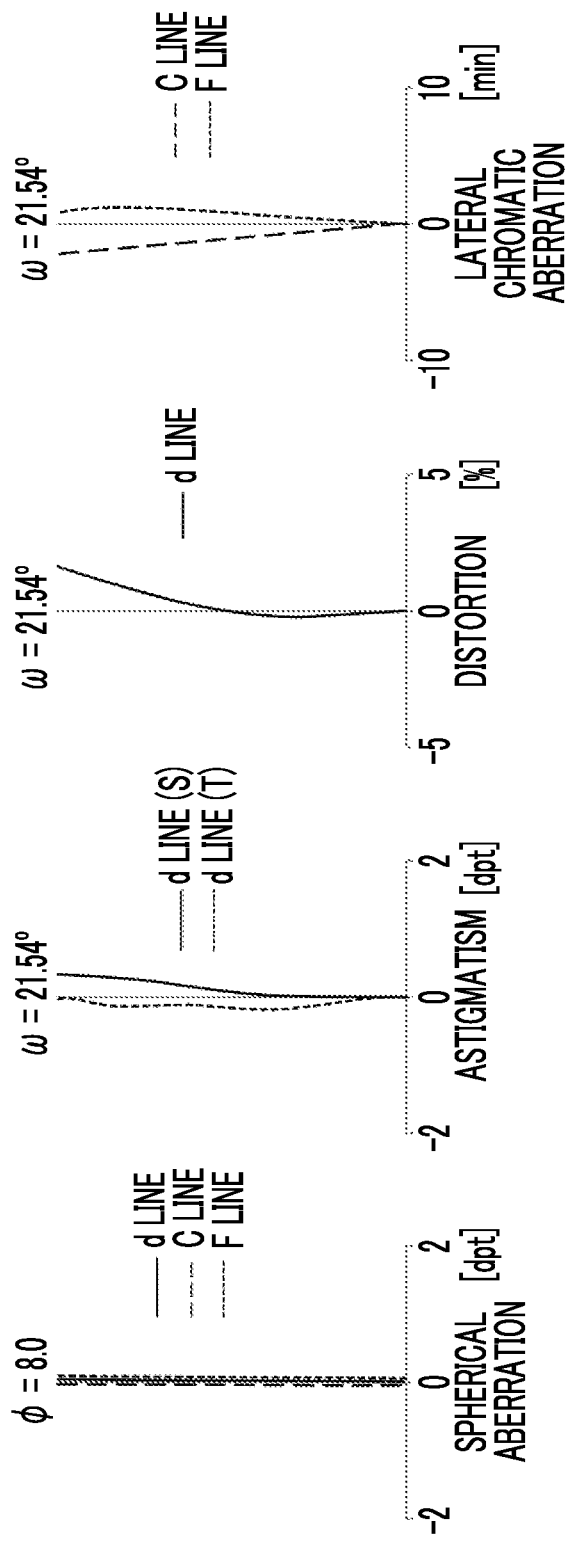
FIG. 7 illustrates various aberration diagrams of the observation optical system of Example 3.

For the observation optical system 5 of Example 3, basic lens data is shown in Table 9, specifications are shown in Table 10, variable surface spacing is shown in Table 11, aspherical coefficients are shown in Table 12, and various aberration diagrams in a state where the diopter is −1 diopter are illustrated in FIG. 7.

TABLE 9

Example 3

| Sn | R | D | Nd | vd |
|---|---|---|---|---|
| 1 | ∞ | 0.7000 | 1.51900 | 64.90 |
| 2 | ∞ | 4.0000 | | |
| 3 | ∞ | 0.5000 | 1.51900 | 64.90 |
| 4 | ∞ | DD[4] | | |

TABLE 9-continued

Example 3

| Sn | R | D | Nd | vd |
|---|---|---|---|---|
| *5 | −957.5923 | 6.4997 | 1.76583 | 51.42 |
| *6 | −12.4209 | 3.1022 | | |
| *7 | −10.9923 | 1.4646 | 1.63351 | 23.63 |
| *8 | 561.6821 | 0.5002 | | |
| 9 | −108.6848 | 3.0251 | 1.73856 | 54.14 |
| 10 | −30.2524 | 1.0007 | | |
| *11 | −23.4699 | 3.7458 | 1.72392 | 55.30 |
| *12 | −16.9672 | 0.3000 | | |
| *13 | −92.7540 | 2.9123 | 1.72358 | 55.32 |
| *14 | −27.6520 | DD[14] | | |
| 15 | ∞ | 0.8000 | 1.49023 | 57.50 |
| 16 | ∞ | 15.0000 | | |
| 17 (EP) | ∞ | | | |

TABLE 10

Example 3

| Diopter | −1 dpt | −5.5 dpt | +3.5 dpt |
|---|---|---|---|
| f | 20.98 | 20.98 | 20.98 |
| Apparent Field of View (°) | 43.08 | 40.46 | 45.29 |
| H | 8.20 | | |

TABLE 11

Example 3

| Diopter | −1 dpt | −5.5 dpt | +3.5 dpt |
|---|---|---|---|
| DD[4] | 3.1982 | 1.2435 | 5.1530 |
| DD[14] | 2.4504 | 4.4051 | 0.4957 |

TABLE 12

Example 3

| Sn | 5 | 6 | 7 | 8 |
|---|---|---|---|---|
| KA | 1.0000000E+00 | 1.0000000E+00 | 1.0000000E+00 | 1.0000000E+00 |
| A4 | −6.5412651E−05 | 1.1314183E−04 | 1.8239985E−04 | −1.2225328E−05 |
| A6 | 1.1493802E−07 | −3.5090225E−07 | −5.6910515E−07 | −2.2749529E−08 |
| A8 | 2.2928271E−09 | 8.0558013E−09 | 9.4319123E−10 | −6.5448884E−11 |
| A10 | 1.6236705E−11 | −3.9730885E−11 | 1.7822726E−11 | −5.1634759E−13 |
| A12 | 4.7446500E−13 | 4.9872961E−13 | 3.2206739E−14 | −2.3025359E−15 |
| A14 | −9.3012853E−16 | −3.0412385E−15 | −6.9491673E−16 | −3.5153752E−17 |
| A16 | −4.1268860E−18 | 2.5434273E−17 | −6.0594063E−18 | −4.0094272E−19 |
| A18 | −3.2742739E−19 | 3.4800018E−20 | −4.2800802E−21 | 2.3785796E−21 |
| A20 | 1.9504649E−21 | −1.7249762E−22 | −1.4620702E−22 | 1.2400457E−23 |

| Sn | 11 | 12 | 13 | 14 |
|---|---|---|---|---|
| KA | 1.0000000E+00 | 1.0000000E+00 | 1.0000000E+00 | 1.0000000E+00 |
| A4 | 2.9858049E−06 | 5.4698464E−06 | −4.7041746E−06 | 8.3964067E−06 |
| A6 | 2.0014534E−08 | −4.8291856E−08 | 9.9703256E−09 | −3.5252409E−08 |
| A8 | 8.5849807E−11 | −3.9395572E−11 | −7.5182313E−11 | 1.8295009E−10 |
| A10 | 1.4374520E−13 | 1.6276201E−13 | 7.6743727E−13 | 7.3699883E−13 |
| A12 | 3.5173207E−15 | 3.7436118E−16 | 3.2071500E−15 | 9.1927854E−16 |
| A14 | 7.8945317E−18 | 7.8473008E−19 | 2.0615319E−17 | 3.3386548E−17 |
| A16 | 3.6792224E−19 | 2.7294789E−20 | 2.4757759E−19 | −3.7161273E−20 |
| A18 | 4.2453449E−22 | 1.2360577E−21 | −2.0313912E−22 | 2.2388076E−22 |
| A20 | −7.2162145E−25 | 6.3051968E−24 | −6.1287537E−24 | −9.2469308E−25 |

Example 4

Figure 8:
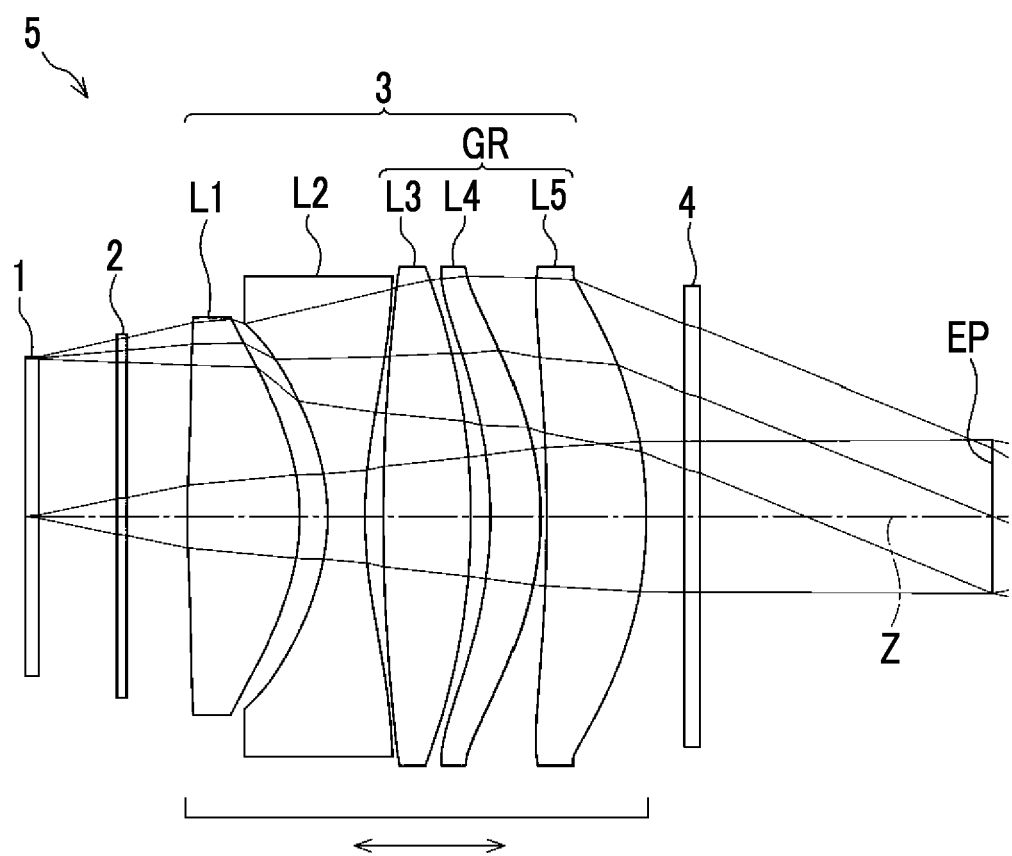
FIG. 8 is a cross-sectional view illustrating a configuration and luminous flux of an observation optical system of Example 4.

FIG. 8 illustrates a configuration and luminous flux of the observation optical system 5 of Example 4. The observation optical system 5 of Example 4 comprises the display element 1, the optical member 2, the eyepiece lens 3, and the optical member 4 in order from the display element side to the eyepoint side.

The eyepiece lens 3 consists of five lenses of the first lens L1 to the fifth lens L5 in order from the display element side to the eyepoint side. The rear side lens group GR consists of the third lens L3, the fourth lens L4, and the fifth lens L5. The first lens L1 is a positive lens having a biconvex shape in a paraxial region. The second lens L2 is a negative lens having a biconcave shape in a paraxial region. The third lens L3 is a positive lens having a biconvex shape. The fourth lens L4 and the fifth lens L5 are positive lenses having a meniscus shape of which a concave surface faces toward the display element side in a paraxial region. All of the first lens L1 to the fifth lens L5 are single lenses. Both surfaces of all of the first lens L1, the second lens L2, the fourth lens L4, and the fifth lens L5 are aspherical surfaces. In the diopter adjustment, the five lenses of the first lens L1 to the fifth lens L5 move as a single body.

Figure 9:
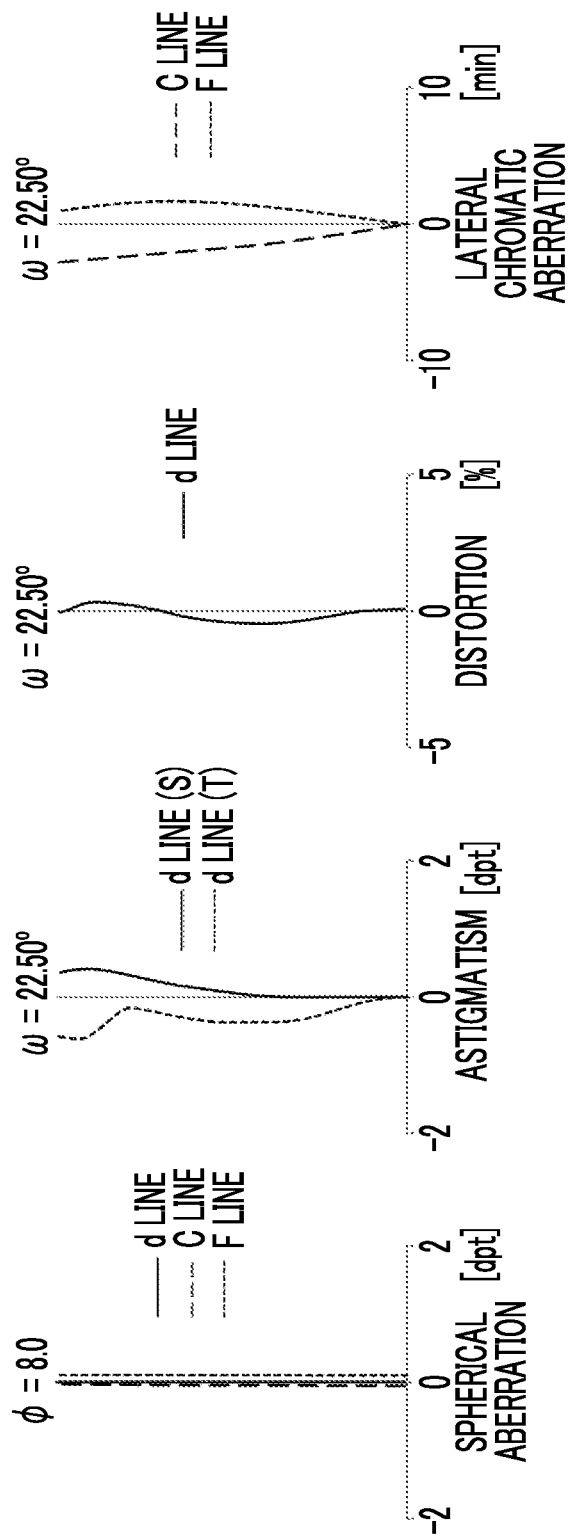
FIG. 9 illustrates various aberration diagrams of the observation optical system of Example 4.

For the observation optical system 5 of Example 4, basic lens data is shown in Table 13, specifications are shown in Table 14, variable surface spacing is shown in Table 15, aspherical coefficients are shown in Table 16, and various aberration diagrams in a state where the diopter is −1 diopter are illustrated in FIG. 9.

TABLE 13

Example 4

| Sn | R | D | Nd | vd |
|---|---|---|---|---|
| 1 | ∞ | 0.7000 | 1.51900 | 64.90 |
| 2 | ∞ | 4.0000 | | |
| 3 | ∞ | 0.5000 | 1.51900 | 64.90 |
| 4 | ∞ | DD[4] | | |
| *5 | 62.1125 | 5.7691 | 1.88928 | 39.07 |
| *6 | −12.1523 | 1.4287 | | |
| *7 | −11.2287 | 1.9071 | 1.63351 | 23.63 |
| *8 | 24.1814 | 0.9461 | | |
| 9 | 104.4907 | 4.4817 | 1.66482 | 58.26 |
| 10 | −37.1953 | 1.0000 | | |
| *11 | −22.9010 | 2.5301 | 1.82830 | 45.17 |
| *12 | −16.6005 | 0.3000 | | |
| *13 | −92.6024 | 5.1320 | 1.53480 | 63.66 |
| *14 | −22.7089 | DD[14] | | |
| 15 | ∞ | 0.8000 | 1.49023 | 57.50 |
| 16 | ∞ | 15.0000 | | |
| 17 (EP) | ∞ | | | |

TABLE 14

Example 4

| Diopter | −1 dpt | −5.5 dpt | +3.5 dpt |
|---|---|---|---|
| f | 19.39 | 19.39 | 19.39 |
| Apparent Field of View (°) | 44.99 | 42.62 | 46.78 |
| H | 8.20 | | |

TABLE 15

Example 4

| Diopter | −1 dpt | −5.5 dpt | +3.5 dpt |
|---|---|---|---|
| DD[4] | 2.8123 | 1.1316 | 4.4930 |
| DD[14] | 1.9310 | 3.6117 | 0.2504 |

TABLE 16

Example 4

| Sn | 5 | 6 | 7 | 8 |
|---|---|---|---|---|
| KA | 1.0000000E+00 | 1.0000000E+00 | 1.0000000E+00 | 1.0000000E+00 |
| A4 | −1.1241651E−04 | 1.6186935E−04 | 2.3989912E−04 | −9.3289679E−05 |
| A6 | 6.3258085E−07 | −3.3605759E−07 | −7.7039151E−07 | −9.3496868E−08 |
| A8 | −2.0752551E−09 | 6.6864034E−09 | −5.9315250E−09 | 8.3334389E−10 |
| A10 | 2.4564570E−12 | −6.6004739E−11 | 1.1696304E−10 | 1.1889133E−12 |
| A12 | 3.8977466E−13 | 8.1786432E−13 | −3.4757365E−13 | 6.0254344E−15 |
| A14 | −9.4717652E−16 | −3.4639416E−15 | 9.2837781E−16 | 3.1521804E−18 |
| A16 | −3.5278168E−18 | 2.0169608E−17 | −2.1821116E−17 | −3.7368560E−19 |
| A18 | −2.9376366E−19 | −1.9464914E−20 | 5.6496847E−20 | 1.0547603E−21 |
| A20 | 1.7422313E−21 | −8.7726703E−22 | 1.0144715E−21 | −7.2377292E−24 |

| Sn | 11 | 12 | 13 | 14 |
|---|---|---|---|---|
| KA | 1.0000000E+00 | 1.0000000E+00 | 1.0000000E+00 | 1.0000000E+00 |
| A4 | 2.7424190E−05 | 4.9847741E−05 | −6.5121037E−06 | −2.4319913E−05 |
| A6 | 3.0882736E−08 | 1.2055883E−07 | 1.5990718E−07 | 7.5331146E−08 |
| A8 | 3.2509277E−10 | 9.2338638E−11 | −2.6353951E−10 | 6.7326843E−10 |
| A10 | 4.1304834E−13 | 4.7401633E−13 | −6.6495822E−13 | −1.6602212E−12 |
| A12 | 4.2712951E−15 | 5.7617991E−15 | −6.7091580E−15 | −9.8178281E−16 |
| A14 | 2.4458592E−17 | −1.2901153E−17 | 2.9949803E−17 | 1.0096057E−17 |
| A16 | 3.0870670E−19 | 5.6841002E−20 | 3.8293182E−19 | −1.4640725E−19 |
| A18 | −6.0896602E−22 | 1.3516202E−21 | 2.0430187E−23 | 1.0716876E−21 |
| A20 | −2.8874275E−24 | 1.8588218E−24 | −1.4675061E−24 | 3.2418834E−24 |

Example 5

Figure 10:
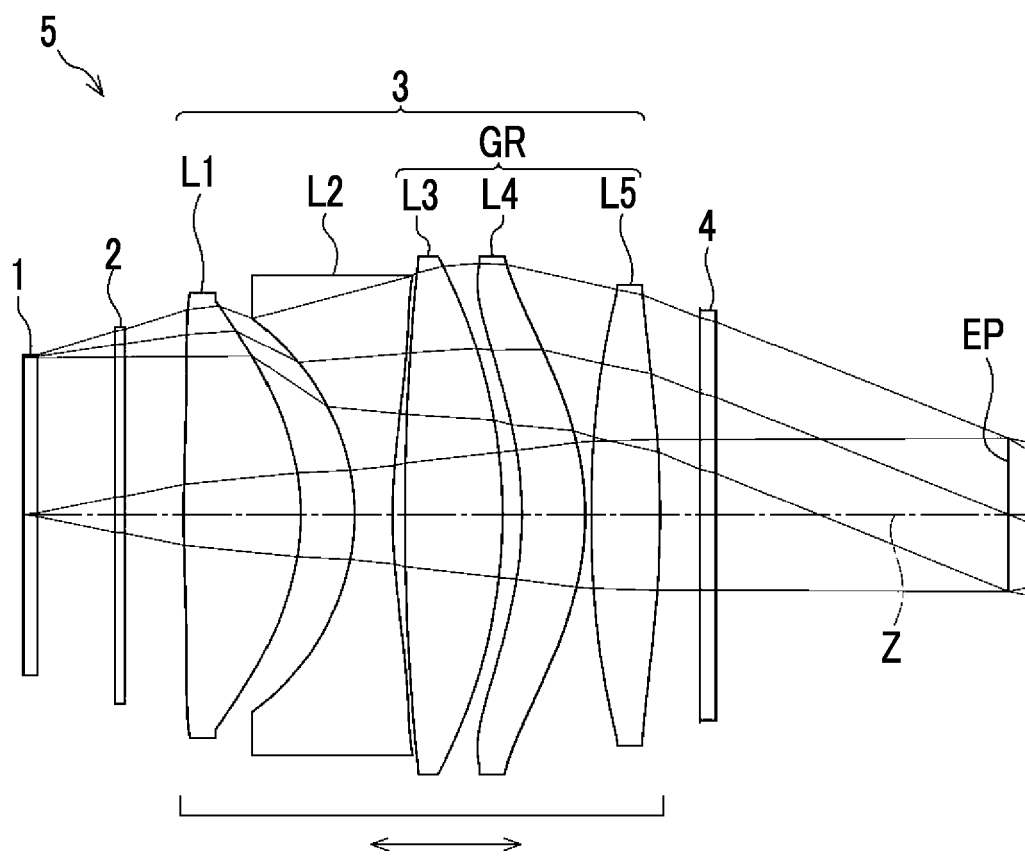
FIG. 10 is a cross-sectional view illustrating a configuration and luminous flux of an observation optical system of Example 5.

FIG. 10 illustrates a configuration and luminous flux of the observation optical system 5 of Example 5. The observation optical system 5 of Example 5 comprises the display element 1, the optical member 2, the eyepiece lens 3, and the optical member 4 in order from the display element side to the eyepoint side.

The eyepiece lens 3 consists of five lenses of the first lens L1 to the fifth lens L5 in order from the display element side to the eyepoint side. The rear side lens group GR consists of the third lens L3, the fourth lens L4, and the fifth lens L5. The first lens L1 is a positive lens having a biconvex shape in a paraxial region. The second lens L2 is a negative lens having a biconcave shape in a paraxial region. The third lens L3 is a positive lens having a biconvex shape. The fourth lens L4 is a positive lens having a meniscus shape of which a concave surface faces toward the display element side in a paraxial region. The fifth lens L5 is a positive lens having a biconvex shape in a paraxial region. All of the first lens L1 to the fifth lens L5 are single lenses. Both surfaces of all of the first lens L1, the second lens L2, the fourth lens L4, and the fifth lens L5 are aspherical surfaces. In the diopter adjustment, the five lenses of the first lens L1 to the fifth lens L5 move as a single body.

Figure 11:
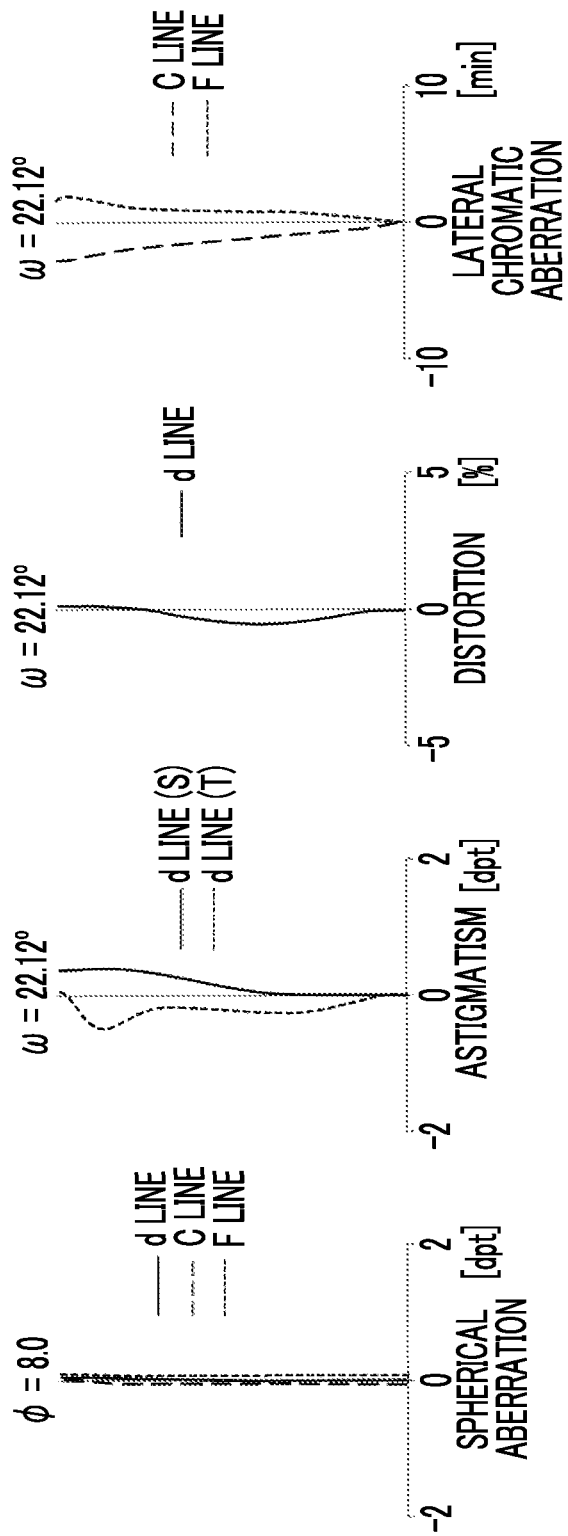
FIG. 11 illustrates various aberration diagrams of the observation optical system of Example 5.

For the observation optical system 5 of Example 5, basic lens data is shown in Table 17, specifications are shown in Table 18, variable surface spacing is shown in Table 19, aspherical coefficients are shown in Table 20, and various aberration diagrams in a state where the diopter is −1 diopter are illustrated in FIG. 11.

TABLE 17

Example 5

| Sn | R | D | Nd | vd |
|---|---|---|---|---|
| 1 | ∞ | 0.7000 | 1.51900 | 64.90 |
| 2 | ∞ | 4.0000 | | |
| 3 | ∞ | 0.5000 | 1.51900 | 64.90 |
| 4 | ∞ | 2.7368 | | |
| *5 | 91.2714 | 5.9727 | 1.81419 | 46.58 |
| *6 | −12.9687 | 2.7621 | | |
| *7 | −11.4590 | 1.9376 | 1.63351 | 23.63 |
| *8 | 30.3958 | 0.6469 | | |
| 9 | 129.9633 | 5.0000 | 1.84894 | 43.11 |
| 10 | −29.1941 | 1.0000 | | |
| *11 | −19.7343 | 3.2619 | 1.53480 | 55.73 |
| *12 | −15.4743 | 0.3000 | | |
| *13 | 58.6895 | 3.5314 | 1.53480 | 55.73 |
| *14 | −54.4633 | 2.0513 | | |
| 15 | ∞ | 0.8000 | 1.49023 | 57.50 |
| 16 | ∞ | 15.0000 | | |
| 17 (EP) | ∞ | | | |

TABLE 18

Example 5

| Diopter | −1 dpt | −5.5 dpt | +3.5 dpt |
|---|---|---|---|
| f | 19.85 | 19.85 | 19.85 |
| Apparent Field of View (°) | 44.23 | 41.41 | 46.68 |
| H | 8.20 | | |

TABLE 19

Example 5

| Diopter | −1 dpt | −5.5 dpt | +3.5 dpt |
|---|---|---|---|
| DD[4] | 2.7368 | 0.9728 | 4.5009 |
| DD[14] | 2.0513 | 3.8153 | 0.2872 |

TABLE 20

Example 5

| Sn | 5 | 6 | 7 | 8 |
|---|---|---|---|---|
| KA | 1.0000000E+00 | 1.0000000E+00 | 1.0000000E+00 | 1.0000000E+00 |
| A4 | −7.3161793E−05 | 1.2207733E−04 | 1.3351513E−04 | −9.6911370E−05 |
| A6 | 6.9590098E−07 | −2.9771266E−07 | −1.3452777E−06 | −2.9313704E−08 |
| A8 | −4.8010885E−09 | 2.7839277E−09 | 5.5544522E−09 | 1.2479973E−09 |
| A10 | −3.0059996E−11 | −5.1962503E−11 | 9.3840037E−11 | −3.6774430E−13 |
| A12 | 4.7060542E−13 | 7.7582376E−13 | −7.1334645E−13 | 4.7019832E−15 |
| A14 | 6.6340937E−16 | −4.0120314E−15 | 1.3183463E−15 | 1.209943 IE−17 |
| A16 | 8.0601429E−18 | 1.1472090E−17 | −1.6554576E−17 | 1.7130576E−19 |
| A18 | −2.9305557E−19 | −1.0355433E−20 | 1.8282185E−19 | 1.7875629E−21 |
| A20 | 1.1025385E−21 | −3.5789848E−23 | 5.3146160E−22 | −1.6415710E−23 |

TABLE 20-continued

| | Example 5 | | | |
|---|---|---|---|---|
| Sn | 11 | 12 | 13 | 14 |
| KA | 1.0000000E+00 | 1.0000000E+00 | 1.0000000E+00 | 1.0000000E+00 |
| A4 | 8.3086888E−05 | 5.9298715E−05 | −3.3216744E−06 | 1.4096775E−05 |
| A6 | −1.4928080E−07 | 2.4345533E−07 | 3.1163470E−07 | −7.9817420E−08 |
| A8 | 6.8786231E−10 | 5.4810080E−11 | −1.8847096E−09 | 2.4123938E−09 |
| A10 | 2.5770860E−12 | −3.7398160E−13 | 1.2753669E−12 | −1.2860226E−11 |
| A12 | 2.4476134E−15 | 4.1925906E−15 | −8.9310400E−15 | −2.9968047E−16 |
| A14 | 1.3375941E−17 | −1.7777804E−17 | 2.2512780E−17 | 6.5425761E−17 |
| A16 | 2.9101180E−19 | 1.4320086E−19 | 6.5920817E−19 | 2.2596921E−19 |
| A18 | −1.7680782E−21 | 1.2641328E−21 | −1.3090387E−21 | −7.9128784E−22 |
| A20 | 3.5278875E−25 | −3.8441184E−24 | −6.7773483E−24 | 4.3214278E−24 |

Table 21 shows the corresponding values of Conditional Expressions (1) to (33) of the observation optical system 5 of Examples 1 to 5. Values shown in Table 21 are values based on the d line.

TABLE 21

| Expression Number | | Example 1 | Example 2 | Example 3 | Example 4 | Example 5 |
|---|---|---|---|---|---|---|
| (1) | H/f | 0.369 | 0.358 | 0.391 | 0.423 | 0.413 |
| (2) | N1−N2 | 0.13617 | 0.21757 | 0.13232 | 0.25577 | 0.18068 |
| (3) | d2/R2f | −0.181 | −0.157 | −0.133 | −0.170 | −0.169 |
| (4) | dL/f | 1.128 | 1.091 | 1.075 | 1.212 | 1.23 |
| (5) | f/RRr | −0.971 | −0.895 | −0.759 | −0.854 | −0.365 |
| (6) | dr/RRr | −0.233 | −0.104 | −0.105 | −0.226 | −0.065 |
| (7) | f/f12 | 0.687 | 0.197 | 0.278 | 0.317 | 0.225 |
| (8) | (R2f − R1r)/(R2f + R1r) | −0.028 | −0.122 | −0.061 | −0.04 | −0.062 |
| (9) | (RRf − RQr)/(RRf + RQr) | 0.807 | 0.49 | 0.691 | 0.696 | 1.716 |
| (10) | (R2r + R2f)/(R2r − R2f) | 0.764 | 0.576 | 0.962 | 0.366 | 0.452 |
| (11) | f/fGR | 0.76 | 1.136 | 1.016 | 1.016 | 1.145 |
| (12) | f/f1 | 1.652 | 1.36 | 1.281 | 1.634 | 1.387 |
| (13) | f/f3 | 0.299 | 0.861 | 0.376 | 0.464 | 0.697 |
| (14) | f1/f3 | 0.181 | 0.633 | 0.293 | 0.284 | 0.502 |
| (15) | H/f1 | 0.609 | 0.487 | 0.5 | 0.691 | 0.573 |
| (16) | f1/f2 | −0.768 | −1.112 | −0.964 | −1.001 | −1.109 |
| (17) | f2/3 | −0.235 | −0.57 | −0.304 | −0.284 | −0.453 |
| (18) | f/|f2| | 1.268 | 1.512 | 1.234 | 1.635 | 1.538 |
| (19) | dL/TL | 0.716 | 0.725 | 0.738 | 0.756 | 0.764 |
| (20) | d13/|f2| | 0.31 | 0.367 | 0.298 | 0.361 | 0.414 |
| (21) | (R1r + R1f)/(R1r − R1f) | −0.434 | −0.766 | −1.026 | −0.673 | −0.751 |
| (22) | (R3r + R3f)/(R3r − R3f) | −5.893 | −0.741 | −1.771 | −0.475 | −0.633 |
| (23) | (R3f − R2r)/(R3f + R2r) | −1.596 | 0.401 | −1.48 | 0.624 | 0.621 |
| (24) | d2/υd2 | 0.076 | 0.063 | 0.062 | 0.081 | 0.082 |
| (25) | TL/f2 | −1.997 | −2.275 | −1.796 | −2.623 | −2.475 |
| (26) | d12/T2 | 0.079 | 0.135 | 0.163 | 0.086 | 0.152 |
| (27) | d12/d2 | 0.75 | 1.59 | 2.118 | 0.749 | 1.426 |
| (28) | d01/f | 0.447 | 0.413 | 0.381 | 0.392 | 0.379 |
| (29) | d12/TL | 0.049 | 0.09 | 0.102 | 0.046 | 0.086 |
| (30) | H/TL | 0.234 | 0.238 | 0.268 | 0.264 | 0.257 |
| (31) | H/f2 | −0.468 | −0.542 | −0.482 | −0.691 | −0.635 |
| (32) | H/f3 | 0.11 | 0.309 | 0.147 | 0.196 | 0.288 |
| (33) | H/fGR | 0.28 | 0.407 | 0.397 | 0.43 | 0.473 |

The observation optical system 5 of Examples 1 to 5 has an apparent field of view of 35 degrees or more at the half angle of view in a state where the diopter is −1 diopter, and has a wide apparent field of view. Particularly, the observation optical system 5 of Examples 3 to 5 has an apparent field of view of 40 degrees or more at the half angle of view in a state where the diopter is −1 diopter. In addition, the observation optical system 5 of Examples 1 to 5 implements high optical performance by favorably correcting various aberrations while being configured in a small size.

Figure 12:
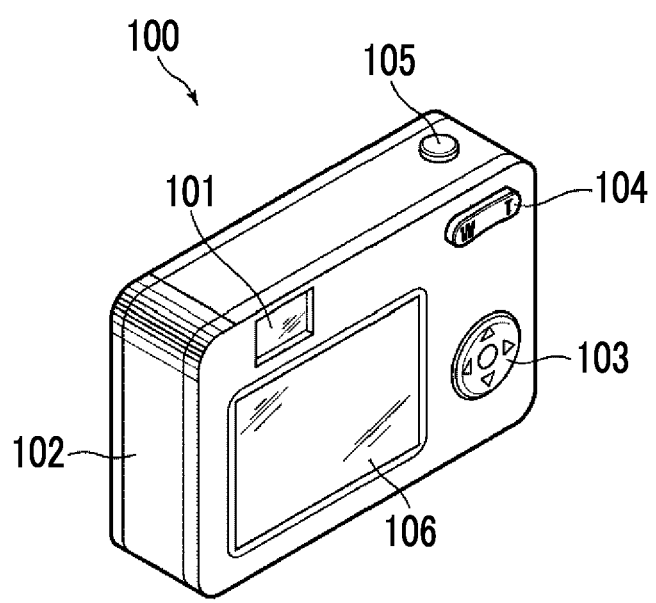
FIG. 12 is a perspective view of a rear surface side of an optical apparatus according to one embodiment.

Next, an optical apparatus comprising the observation optical system according to the embodiment of the present disclosure will be described. FIG. 12 is a perspective view illustrating a schematic configuration of a rear surface side of a camera 100 that is an optical apparatus according to one embodiment of the present disclosure. As an example, the camera 100 is a digital camera. The camera 100 comprises a finder 101 according to one embodiment of the present disclosure in an upper portion of a camera body 102. The finder 101 is an example of an observation optical apparatus and comprises the observation optical system according to one embodiment of the present disclosure.

The camera 100 comprises an operation button 103 for performing various types of setting, a zoom lever 104 for changing magnification, and a monitor 106 displaying images and various setting screens on a rear surface of the camera body 102 and comprises a shutter button 105 on an upper surface of the camera body 102. In addition, the camera 100 comprises an imaging lens (not illustrated) on a front surface of the camera body 102 and comprises an imaging element (not illustrated) capturing a subject image formed by the imaging lens inside the camera body 102. A user observes the subject image through the finder 101 from the rear surface side.

While the disclosed technology is illustratively described above using the embodiment and the examples, the disclosed technology is not limited to the embodiment and the examples and can be subjected to various modifications. For example, the curvature radius, the surface spacing, the refractive index, the Abbe number, and the aspherical coefficient of each lens are not limited to the values illustrated in each of the above numerical value examples and may have other values. In addition, the optical apparatus according to the embodiment of the present disclosure is not limited to the above example. The present disclosure can also be applied to a film camera, a video camera, a head-mounted display, and the like.

What is claimed is:

1. An observation optical system comprising:
a display element; and
an eyepiece lens arranged on an eyepoint side of the display element,
wherein the eyepiece lens consists of a first lens having positive refractive power, a second lens having negative refractive power, and a rear side lens group including two or more lenses in order from a display element side to the eyepoint side,
in a case where a half value of a longest diameter of a display region in the display element is denoted by H, a focal length of the eyepiece lens is denoted by f, a refractive index of the first lens at a d line is denoted by N1, a refractive index of the second lens at the d line is denoted by N2, a thickness of the second lens on an optical axis is denoted by d2, and a paraxial curvature radius of a surface of the second lens on the display element side is denoted by R2f, Conditional Expressions (1), (2-3), and (3) are satisfied, which are represented by $$0.3 < H/f < 0.5 \quad (1)$$

$$0.13 < N1 - N2 < 0.28 \quad (2\text{-}3)$$

$$-0.2 < d2/R2f < -0.003 \quad (3),$$

the second lens is a biconcave lens, and
in a case where a paraxial curvature radius of a surface of the second lens on the eyepoint side is denoted by R2r, Conditional Expression (10-3) is satisfied, which is represented by $$0.3 < (R2r + R2f)/(R2r - R2f) < 1.6 \quad (10\text{-}3).$$

2. The observation optical system according to claim 1, wherein the number of lenses included in the eyepiece lens is four or five.

3. The observation optical system according to claim 1, wherein in a case where a distance from a lens surface of the eyepiece lens closest to the display element side to a lens surface of the eyepiece lens closest to the eyepoint side on the optical axis is denoted by dL, Conditional Expression (4) is satisfied, which is represented by $$0.5 < dL/f < 2 \quad (4).$$

4. The observation optical system according to claim 1, wherein in a case where a paraxial curvature radius of a lens surface of the eyepiece lens closest to the eyepoint side is denoted by RRr, Conditional Expression (5) is satisfied, which is represented by $$-1.3 < f/RRr < -0.2 \quad (5).$$

5. The observation optical system according to claim 1, wherein in a case where a thickness of a lens of the eyepiece lens closest to the eyepoint side on the optical axis is denoted by dr, and a paraxial curvature radius of a lens surface of the eyepiece lens closest to the eyepoint side is denoted by RRr, Conditional Expression (6) is satisfied, which is represented by $$-0.3 < dr/RRr < -0.01 \quad (6).$$

6. The observation optical system according to claim 1, wherein in a case where a paraxial curvature radius of a surface of the first lens on the eyepoint side is denoted by R1r, Conditional Expression (8) is satisfied, which is represented by $$-0.2 < (R2f - R1r)/(R2f + R1r) < -0.01 \quad (8).$$

7. The observation optical system according to claim 1, wherein in a case where a paraxial curvature radius of a surface, on the display element side, of a lens of the eyepiece lens closest to the eyepoint side is denoted by RRf, and a paraxial curvature radius of a surface, on the eyepoint side, of a lens adjacent to the display element side of the lens of the eyepiece lens closest to the eyepoint side is denoted by RQr, Conditional Expression (9) is satisfied, which is represented by $$0.1 < (RRf - RQr)/(RRf + RQr) < 2 \quad (9).$$

8. The observation optical system according to claim 1, wherein in a case where a focal length of the rear side lens group is denoted by fGR, Conditional Expression (11) is satisfied, which is represented by $$0.5 < f/fGR < 1.5 \quad (11).$$

9. The observation optical system according to claim 1, wherein in a case where a focal length of a lens of the rear side lens group closest to the display element side is denoted by f3, Conditional Expression (13) is satisfied, which is represented by $$0.1 < f/f3 < 2 \quad (13).$$

10. The observation optical system according to claim 1, wherein in a case where a focal length of the first lens is denoted by f1, and a focal length of a lens of the rear side lens group closest to the display element side is denoted by f3, Conditional Expression (14) is satisfied, which is represented by $$0.01 < f1/f3 < 1.5 \quad (14).$$

11. The observation optical system according to claim 1, wherein in a case where a focal length of the first lens is denoted by f1, Conditional Expression (15) is satisfied, which is represented by $$0.1 < H/f1 < 0.9 \quad (15).$$

12. The observation optical system according to claim 1, wherein an absorption layer that absorbs light is provided in at least a part of a peripheral portion of the second lens.

13. The observation optical system according to claim 1, wherein in diopter adjustment, an entire eyepiece lens moves as a single body.

14. An optical apparatus comprising:
the observation optical system according to claim 1.

15. An observation optical system comprising:
a display element; and
an eyepiece lens arranged on an eyepoint side of the display element, wherein the eyepiece lens consists of a first lens having positive refractive power, a second lens having negative refractive power, and a rear side lens group including two or more lenses in order from a display element side to the eyepoint side, in a case where a half value of a longest diameter of a display region in the display element is denoted by H, a focal length of the eyepiece lens is denoted by f, a refractive index of the first lens at a d line is denoted by N1, a refractive index of the second lens at the d line is denoted by N2, a thickness of the second lens on an optical axis is denoted by d2, and a paraxial curvature radius of a surface of the second lens on the display element side is denoted by R2f, Conditional Expressions (1), (2-3), and (3) are satisfied, which are represented by $$0.3 < H/f < 0.5 \tag{1}$$

$$0.13 < N1 - N2 < 0.28 \tag{2-3}$$

$$-0.2 < d2/R2f < -0.003 \tag{3},$$

in a case where a paraxial curvature radius of a surface of the second lens on the eyepoint side is denoted by R2r, Conditional Expression (10-3) is satisfied, which is represented by $$0.3 < (R2r + R2f)/(R2r - R2f) < 1.6 \tag{10-3, and}$$

in a case where a combined focal length of the first lens and the second lens is denoted by f12, Conditional Expression (7) is satisfied, which is represented by $$0.05 < f/f12 < 1.5 \tag{7}.$$

16. An optical apparatus comprising:
the observation optical system according to claim 15.

17. An observation optical system comprising:
a display element; and
an eyepiece lens arranged on an eyepoint side of the display element,
wherein the eyepiece lens consists of a first lens having positive refractive power, a second lens having negative refractive power, and a rear side lens group including two or more lenses in order from a display element side to the eyepoint side,
in a case where a half value of a longest diameter of a display region in the display element is denoted by H, a focal length of the eyepiece lens is denoted by f, a refractive index of the first lens at a d line is denoted by N1, a refractive index of the second lens at the d line is denoted by N2, a thickness of the second lens on an optical axis is denoted by d2, and a paraxial curvature radius of a surface of the second lens on the display element side is denoted by R2f, Conditional Expressions (1), (2-3), and (3) are satisfied, which are represented by $$0.3 < H/f < 0.5 \tag{1}$$

$$0.13 < N1 - N2 < 0.28 \tag{2-3}$$

$$-0.2 < d2/R2f < -0.003 \tag{3},$$

in a case where a paraxial curvature radius of a surface of the second lens on the eyepoint side is denoted by R2r, Conditional Expression (10-3) is satisfied, which is represented by $$0.3 < (R2r + R2f)/(R2r - R2f) < 1.6 \tag{10-3, and}$$

in a case where a focal length of the first lens is denoted by f1, Conditional Expression (12) is satisfied, which is represented by $$0.5 < f/f1 < 1.9 \tag{12}.$$

18. An optical apparatus comprising:
the observation optical system according to claim 17.

* * * * *